United States Patent [19]
Schieber

[11] Patent Number: 5,866,824
[45] Date of Patent: Feb. 2, 1999

[54] GAS TURBINE METER

[75] Inventor: William M. Schieber, Erie, Pa.

[73] Assignee: American Meter Company, Erie, Pa.

[21] Appl. No.: 780,867

[22] Filed: Jan. 24, 1997

[51] Int. Cl.[6] .................................................. G01F 15/00
[52] U.S. Cl. ......................................................... 73/861.79
[58] Field of Search ........................... 73/861.77, 861.78, 73/861.79, 861.84, 861.91, 861.81

[56] References Cited

U.S. PATENT DOCUMENTS

| 3,710,622 | 1/1973  | Hammond et al. | 73/861.84 |
|-----------|---------|----------------|-----------|
| 3,908,444 | 9/1975  | Peter          | 73/71.3   |
| 4,122,717 | 10/1978 | Loesch         | 73/231    |
| 4,408,498 | 10/1983 | Heath          | 73/861.79 |
| 4,419,052 | 12/1983 | Stamm          | 416/214   |
| 4,534,226 | 8/1985  | Rose           | 73/861.84 |
| 5,003,828 | 4/1991  | Van Der Burg   | 73/861.77 |
| 5,325,729 | 7/1994  | Goodson et al. | 73/861.91 |
| 5,509,305 | 4/1996  | Hussain et al. | 73/861.84 |
| 5,689,071 | 11/1997 | Ruffner et al. | 73/861.84 |
| 5,728,950 | 3/1998  | Boulanger      | 73/861.79 |

Primary Examiner—Elizabeth L. Dougherty
Assistant Examiner—Jewel V. Thompson
Attorney, Agent, or Firm—Edward W. Goebel, Jr.

[57] ABSTRACT

A gas turbine meter includes a measuring cartridge which has a measuring rotor that rotates in one direction at a speed approximately proportional to the velocity of gas flowing through the meter and a reference rotor mounted downstream of the measuring rotor which rotates in the opposite direction from the measuring rotor. An inlet flow straightener upstream of the measuring rotor causes gas to flow substantially axially within the meter, and a reference flow straightener mounted between the measuring rotor and the reference rotor also causes gas to flow substantially axially within the meter. The inlet flow straightener and the reference flow straightener are constructed so that a measurement of the accuracy of the meter can be conducted without measuring differences in pressure and temperature between the locations of the measuring rotor and the reference rotor. A signal processor provides an indication of the accuracy of the gas turbine meter based on the quotient of a measuring signal, which is proportional to the speed of rotation of the measuring rotor, divided by a reference signal, which is proportional to the speed of rotation of the reference rotor.

52 Claims, 20 Drawing Sheets

FRONT PANEL

Front Panel

GAS TURBINE METER

BACKGROUND OF THE INVENTION

This invention relates to turbine meters of the type used to measure the flow of gas by converting kinetic energy of the flowing gas to rotation of a turbine which has its axis parallel to the path of gas flow.

Turbine meters are used to measure both the flow of liquids and the flow of gases. However, the theory of operation of gas turbine meters differs somewhat from that of liquid driven meters due to the differences in the density and kinematic viscosity of the two fluids. Since liquids are essentially incompressible, the density of liquids does not vary significantly with pressure or temperature. Also, the density of liquids is relatively high so there is ample driving torque from liquid flow to overcome mechanical friction in the meter. Thus, small changes in retarding torques, for example due to increases in friction between moving parts, do not affect the performance of liquid turbine meters. Conversely, the density of gas is relatively low so that gas turbine meters are highly sensitive to changes in retarding torques within the meters, especially at low pressure and low flowrates. Changes in kinematic viscosity do affect the performance of both gas turbine meters and liquid turbine meters.

The total volume of gas passing through the meter is determined by counting the number of revolutions of a measuring rotor mounted within the meter. Gas turbine meters are known as inferential meters because they infer how much gas has passed through by observing something else. A gas turbine meter is a gas velocity measuring device. The actual flowrate can be inferred from the velocity of the gas because the cross-sectional area of the annular passage preceding the rotor is a known.

The driving energy to turn the rotor is the kinetic energy, or energy of motion, of the gas being measured. The gas impinges on rotor blades mounted on the measuring rotor and overcomes retarding forces that inhibit the rotor from turning. Because the density of gas is low, it is necessary to reduce the cross-sectional area of the gas pipeline in which a gas turbine meter is mounted to accelerate the flow of the gas to a higher kinetic energy which allows the gas to be measured by the gas turbine meter. An inlet flow guide, or flow straightener, serves to reduce the area through which the gas flows to approximately one-half the area of the pipe in which the turbine meter is installed. Reducing the cross-sectional area of the flow path of the gas increases the velocity of the gas proportionately when the gas flowrate remains constant. Due to the higher density of liquids, liquid turbine meters do not have to accelerate liquids to measure their flow.

Gas turbine meters are commonly installed in pipe lines used in the natural gas industry for the measurement of the flow of large volumes of gas. The volumes are often so large that small errors in measurement can result in large losses of revenue to gas transmission companies and local distribution companies. An example of the magnitude of losses which can occur was presented in a 1992 technical publication of the Netherlands Measurement Institute. Consider a 12-inch turbine meter operating at a pressure of 580 psig and having a gas volume which is 59% of maximum capacity. Assuming the cost of natural gas is $0.0037 per cubic foot, an error of only 0.2% results in a loss of revenue of $160,000 per year. Clearly it is vital to maintain the accuracy of gas turbine meters.

Each gas turbine meter must be separately calibrated to determine its accuracy after it is manufactured. Calibration is necessary because normal, minor variations in meter components cause each gas turbine meter to register a slightly different volumetric flow for a given volume of gas. By way of example, from meter-to-meter blades on turbine measuring rotors vary slightly in shape due to minor manufacturing inconsistencies. As a result, each turbine measuring rotor rotates at a slightly different speed for gas flowing at the same velocity. Similarly, separate sets of measuring rotor bearings of the same make and model can impose slightly different frictional forces on the rotors of separate meters on which they are mounted. Additionally, a gas turbine meter normally has a mechanical register, sometimes called an index, which gives a reading of gas flow volume on a set of dials. A register is typically connected to a turbine measuring rotor through a coupling which includes gears, magnetic couplings and other components which load the turbine rotors of different gas turbine meter to a somewhat different extent. As a result, each gas turbine meter will register its own unique flow level for a given volume of gas.

At the time of manufacture of a gas turbine meter, the accuracy of a meter is proved by testing the meter against a known standard such as a master meter or a bell prover or a sonic nozzle. At a given temperature, a given gas line pressure and a given gas flowrate, the volume of gas registered by the meter is compared to the actual volume of gas which flowed through the meter as determined by the standard. This ratio of the volume of gas measured by a meter's mechanical register to the actual volume of gas flowing through the meter is called the accuracy of the meter. The calibration factor of a meter, referred to by the letter "K," expressed in terms of pulses per unit of volume flowing through a meter, is the amount by which the registered reading of the meter is divided to get a 100% accurate reading. For each of a given series of line pressures at which a gas turbine meter may operate, the K factors are determined for a range of flowrates expected for the meter and a table of these K factors is provided with each meter.

After a gas turbine meter has been installed and is operating, the accuracy of the meter can change over time as a result of factors such as damaged components, increased friction between components due to wear or due to contamination carried by gas flowing through the meter. Thus, there is a need to periodically prove gas turbine meters in the field.

There are currently several methods of proving gas turbine meters while these meters are installed in gas pipelines. These methods include using critical flow provers, sonic nozzle provers and in-line orifice meters. However, the most widely used method of proving meters in the field is by transfer proving. That is, by removing the meter or at least the meter's measuring cartridge from the pipeline, calibrating it with air at atmospheric pressure and then taking into account any changes in accuracy due to factors such as pipeline pressure, gas composition and the possible effects of flow disturbances. However, each of these methods of proving meters in the field is time consuming, interrupts the normal operation of the gas turbine meter and results in undesirable expenses.

By way of explanation, critical flow orifice provers and sonic nozzle provers are devices that operate with a pressure drop across their inlet ports and outlet ports which is above a critical pressure ratio for each such device. The ratio of outlet to inlet pressure required for the operation of the critical flow orifice prover is less than 53% and for the sonic nozzle prover is less than 81%. These provers, which are installed in a pipeline in-line with a gas turbine meter to be proved, are fixed flow devices, meaning that an orifice or nozzle with a given throat diameter will prove only one volumetric flowrate. As a result, different sized orifices or nozzles must be used to generate an accuracy curve over the operating flow range of the gas turbine meter being proved. Changing orifices or nozzles requires that gas be made to bypass this device and that the orifice or nozzle be depressurized. This procedure is time consuming and interrupts the service of the meter. Additionally, optimum accuracy of a critical flow orifice prover or a sonic nozzle prover requires a determination of gas composition, involving sampling of gas for lab analysis or transporting a portable gas chromatograph to the site for gas analysis.

In-line orifice meters present some of the same difficulties faced with critical flow orifice provers and sonic nozzle provers. In-line orifice meters are placed in a pipeline in line with a meter to be proved and operate by measuring the differential pressure across an orifice plate in the flow stream of the gas being measured. Multiple orifice plates may be required to obtain an accuracy curve over the flow range of the gas turbine meter, requiring that the flow of gas bypass the orifice meter and the orifice meter be depressurized for the change of plates. Additionally, this type of meter also requires a knowledge of the specific gravity of the gas being measured, that is the composition of the gas, again requiring lab analysis of the gas or the use of a portable gas chromatograph on site.

Transfer proving consists of testing a meter against a reference meter of known accuracy. The meter being tested is removed from the pipeline from which it is installed and then installed in series with a reference meter. Air is passed through both meters and volume readings are compared to evaluate the accuracy of the gas turbine meter being tested. The removal of the gas turbine meter being tested from the pipeline interrupts the normal service of the meter. Additionally, the accuracy evaluation cannot account for the possible effects of flow disturbances within the pipeline on the accuracy of the meter. Most transfer provers calibrate meters at atmospheric pressure since elevated pressure transfer provers are very costly to own or lease. Additionally, air is the test fluid. Thus, changes in accuracy resulting from pipeline pressure or gas composition are not accounted for when using a transfer prover at atmospheric pressure. Furthermore, the capacity of most transfer provers is inadequate for testing larger turbine meters.

A more recent development has sought to minimize or avoid a need for proving gas turbine meters by compensating for inaccuracies which occur in their operation. This development consists of a gas turbine meter which uses two rotors mounted in close proximity to each other so that they interact fluid dynamically. The basic principle of operation is that meter accuracy and changes in meter accuracy are proportional to the deflected angle of fluid exiting a measuring rotor.

A downstream sensing rotor senses and responds to changes in the exit angle of fluid from turbine blades of the measuring rotor so that the difference in rotor speeds remains constant. The sensing rotor and the associated electronic circuitry are not designed to measure accuracy of the meter, but to automatically adjust the electronic output so that the output of the meter is theoretically 100% accurate. The amount of adjustment required to maintain 100% accuracy is provided for determining the relative change in condition of the meter from its initial calibration. Meters of this type are described in U.S. Pat. No. 4,286,471 Lee, et al. and U.S. Pat. No. 4,305,281 Lee, et al.

However, the design of this type of turbine meter assumes that the system is functioning correctly. If a malfunction exists that results in incorrect flowrates, a customer would not be aware of the problem. Additionally, because the rotors are fluid dynamically coupled, a complete failure of one rotor due to friction or clogging will render the meter inoperative. Furthermore, the rangeability of this gas turbine meter, that is the ratio of maximum to minimum capacity, is reduced approximately 33% from a conventional turbine meter due to the small sensing rotor blade angle and a necessity for fluid dynamic interaction between the two rotors.

Thus, there still remains a need in the natural gas industry for some means or method of rapidly and accurately proving gas turbine meters in gas pipelines under actual operating pressures and temperatures without removing the meters form the pipelines and without interrupting normal service of the meter.

Rotor Bearing Protection

One of the primary causes of failure of gas turbine meters is contamination of the rotor bearings of the measuring rotor of the meters. Natural gas pipelines in which gas turbine meters are installed often contain contaminates such dirt, rust, pipe scale, welding slag, acids, hydrocarbons, etc. that can be carried by the flowing natural gas and passed through a gas turbine meter. One small speck of dirt in a measuring rotor bearing can cause premature wearing of that bearing, increasing the friction within it, and resulting in an early failure of the meter due to a change in its accuracy as a result of drag on the rotor caused by the increased friction. Gas turbine meters have external lubrication which flushes measuring rotor bearings with oil to help remove contaminates from these bearings. Unfortunately, not all contaminates can be removed during this flushing. The remaining contaminates can cause measuring rotor bearings to wear at an accelerated rate and eventually fail. Previous designs of gas turbine meters used various structures in an attempt to protect measuring rotor bearings from contamination, with varying degrees of success. The structures used have included dust shields for measuring rotors and bearing shields for the bearings. The bearings themselves cannot be totally sealed because of the added friction of sealed bearings. As a result, contaminates can enter the rotor bearings after reaching the rotor bearing assembly. Thus, there is a continuing need for a structure which minimizes the potential for contamination of measuring rotor bearings of a gas turbine meter.

Meter Accuracy Adjustment

As indicated above, each gas turbine meter normally has a mechanical mechanism, called a register or an index, which records the volume of gas that has flowed through the meter. The measuring rotor of the meter is coupled through a series of gears, magnetic couplings and the like to a set of dials on the register which indicate the volume of gas that has flowed through the gas turbine meter. Since only a single set of gears and/or couplings can be installed at one time between the measuring rotor and the dials, the register can only be calibrated to be 100% accurate at one flowrate, usually about 60% of the maximum flowrate of the meter.

However, the accuracy of the volume of gas recorded by the dials of a meter's register is checked at the time of a meter's calibration over a range of the meter's operating conditions. At any particular line pressure, an accuracy curve is drawn showing the accuracy of the meter as its flowrate changes. Components of the meter are often modified to attempt to get the accuracy of the meter as consistent as possible over its expected range of flowrates.

Gas turbine meters tend to have an undesirable "hump" in their accuracy curve at low flowrates, signifying that at these flowrates the register records more gas than has actually flowed through the meter. Accuracy curves are shown in FIG. 26 for a gas turbine meter which was pressurized for the accuracy test at 0.25 psi. The segmented line curve shows a typical unacceptable accuracy curve prior to completion of calibration of a gas turbine meter. It shows that this meter records less gas than has actually flowed through it below a flowrate of about 5% of the maximum capacity of the meter. It records more gas than has actually flowed through it until the meter reaches a flow rate of about 60% of its maximum capacity.

Designers and manufacturers of gas turbine meters have used various changes in meter component structure and different methods to attempt to flatten the low flowrate hump in the accuracy curve. By way of example, the hump in the accuracy curve of gas turbine meters at low flowrates has been adjusted by adjusting rotor blade tip clearance with respect to the body of the housing in which the rotor is mounted. Generally, if the accuracy registered at low flowrates is significantly lower than the accuracy at high flowrates, the tip clearance is decreased to bring the low flowrate end of the accuracy curve up toward the high flowrate end. If the accuracy registered at low flowrates is significantly higher than the accuracy registered at high flowrates, the tip clearance is increased to bring the accuracy of low flowrates down to the level of that at higher flowrates.

The accuracy of liquid turbine flow meters has been adjusted by providing a meter housing having a bore with a conical axial cross section adjacent the location where turbine blades are rotating on the meter's rotor assembly. The accuracy of such liquid turbine flow meters has been adjusted by varying the rotor blade tip clearance with respect to the conical bore by adjusting the relative positions of the turbine rotor and the bore. This varies the rate of rotation of the liquid turbine rotor per unit of liquid flow so as to adjust the accuracy of liquid turbine flow meters. Liquid turbine flow meters of this type are shown in U.S. Pat. Nos. 3,370,465 Belle, 3,589,188 Belle and 4,316,392 Leber.

When attempting to apply these principles of accuracy adjustment to gas turbine meters, it is desirable to have the angle of the conical axial cross section of a meter as large as practicable. This enables the accuracy of a gas turbine meter to be adjusted as desired with relatively little adjustment of the position of the turbine blades. It was found, however, that gas turbine meters having conical axial cross sections with angles such as about 21° had their accuracies at higher flowrates drop off to a range of from about 97% to 98%. This is an unacceptable range of accuracies for gas turbine meters.

SUMMARY OF THE INVENTION

A conventional gas turbine meter typically includes an elongated, cylindrical housing which forms a flow path for gas which is flowing within a pipeline in which the housing is mounted. An inlet flow straightener is mounted adjacent an inlet port in the housing to cause gas flowing from the inlet port to flow in an axial direction within the housing. A measuring rotor is mounted downstream of the inlet flow straightener so as to rotate about a central axis of the cylindrical housing. The measuring rotor has turbine blades installed on it which cause it to rotate in one direction at a speed approximately proportional to the velocity of the gas flowing through the housing.

In accordance with one aspect of this invention, a conventional gas turbine meter is modified so as to enable it to be self-proving, that is to be able to have its own accuracy checked without being removed from a pipeline in which it is installed and without interrupting the normal service of the meter. The gas turbine meter includes a reference flow straightener which is mounted in the cylindrical housing downstream of the measuring rotor. Both flow straighteners form constant area passages having areas preceding their respective rotors which are approximately equal to one another.

Additionally, the self-proving gas turbine meter of this invention includes a reference rotor downstream of the second flow straightener and adjacent it. The reference rotor has turbine blades with blade angles which cause the reference rotor to rotate in a direction opposite to the direction of rotation of the measuring rotor. Thus, swirl in the flow of gas which causes the measuring rotor to increase or to decrease its speed has the opposite effect on the reference rotor. This amplifies the effects of swirl and makes it easier to detect.

In accordance with one preferred embodiment of this invention the turbine blades also cause the reference rotor to rotate at a speed which, while approximately proportional to the velocity of the gas flowing through the housing, is less than the speed of rotation of the metering rotor. The lower speed of the reference rotor decreases the likelihood that its components will wear substantially before those of the measuring rotor. This decreases the likelihood that the accuracy and the K factor of the reference rotor will change substantially before those of the measuring rotor.

This self-proving gas turbine meter includes a measuring signal generator which responds to the measuring rotor to generate a measuring signal proportional to the speed of rotation of the measuring rotor. It also includes a reference signal generator which responds to the reference rotor to generate a reference signal proportional to the speed of rotation of the reference rotor.

A signal processor is provided for dividing the measuring signals by the reference signals to produce an indication of the accuracy of the gas turbine meter based on the quotient. As more fully explained below, in determining the accuracy of a gas turbine meter the signal processor also takes into account the K factor, a well known characteristic of a gas turbine meter defined as the number of pulses produced by rotation of the meter's rotor per volume of gas flowing through the meter, of both rotors. The signal processor multiplies the quotient of the measuring signals and the reference signals by the quotient of the K factor of the reference rotor divided by the K factor of the measuring rotor. Where a mechanical register is used to measure gas flow, the signal processor multiplies these by the accuracy of the meter determined at calibration for the existing flow conditions.

The reference rotor and its associated components do not affect the basic function of the gas turbine meter, which is to measure the volumetric flowrate or total volume throughput of natural gas, although the flowrate of gas through the reference rotor can be determined by the signal processor. The self-proving gas turbine meter has dual turbine rotors which are completely, fluid dynamically decoupled by interposing the second flow straightening assembly between the rotors. Both rotors function independently on separate rotor shafts and do not require the presence of the other rotor for the meter to operate as a meter.

A derivation of the self-proving meter accuracy equation shows the basic principles of this invention.

The accuracy of any meter is determined by dividing the volumetric reading of the meter by the volume from the standard.

$$\text{Accuracy} = \frac{\text{Volume}_{meter}}{\text{Volume}_{std}} \quad (1)$$

For steady flow: $Q = V/t$, (2)

where "Q" is the volumetric flowrate, "V" is the total volume and "t" is the total time of flow.

Then, $$\text{Accuracy} = \frac{Q_{meter}}{Q_{std}}. \quad (3)$$

Flowrate is related to frequency "f," which is a measure of the turbine rotation speed of the rotor of the meter in pulses per unit of time. The rotation speed could also be measured by counting the total number of pulses produced by rotation of the rotor for some selected period of time. However, frequency has been chosen as a convenient measure of rotor speed. The pulse factor or meter K factor is by definition the ratio of the total number of output pulses obtained from the rotor to the actual volume of gas that passes through the gas turbine meter at selected meter conditions. Thus, the K factor is by definition 100% accurate. When considering the same time period, the K factor becomes the ratio of the output frequency over the actual flowrate. Thus, the actual flowrate is related to frequency and the K factor by:

$$Q = f/K. \quad (4)$$

As indicated above, where a mechanical output of the measuring rotor is desired it is measured by a register or index connected through a train of gears to the measuring rotor. The register itself can only be adjusted by one K factor when relating rotor speed to flowrate because only one gearing relationship can be used between the rotor and the dials of a register. The K factor chosen is normally at a flowrate which is approximately two-thirds the capacity of the meter. This flowrate is known as the change gear flowrate. The K factor at this flowrate is known as the nominal K factor of the measuring rotor or $K_{nom, meas}$. The nominal K factor is related to the K factor at other flow conditions by:

$$K_{meas} = K_{nom, meas} * \text{Accuracy}_{cal}, \quad (5)$$

where $\text{Accuracy}_{cal}$ is the accuracy of the mechanical output of the measuring rotor, that is the accuracy of the register of the measuring rotor, determined during the initial calibration of the meter at the other flow conditions. The relationship between the flowrate measured by the mechanical output or register and the frequency obtained from the main rotor is from equation (4):

$$Q_{meter} = f/K_{nom, meas}. \quad (6)$$

Then, substituting the equation (6) into equation (3) gives:

$$\text{Accuracy} = \frac{\frac{f}{K_{nom,meas}}}{Q_{std}}. \quad (7)$$

Now, if the accuracy of the meter is the nominal accuracy of the measuring rotor, that is the accuracy determined for particular conditions of operation when it was last calibrated, and the accuracy of the reference rotor by definition is assumed to be one, then:

$$\text{Accuracy}_{meter} = \text{Accuracy}_{meas} = \frac{\text{Accuracy}_{meas}}{1} = \frac{\text{Accuracy}_{meas}}{\text{Accuracy}_{ref}} \quad (8)$$

Thus, accuracy obtained by a self-proving meter is equal to the ratio of the accuracy of the measuring rotor over the accuracy of the reference rotor. The accuracy of the mechanical output of the measuring rotor is based on $K_{nom, meas}$, thus:

$$\text{Accuracy}_{meter} = \frac{f_{meas}/\frac{K_{nom\,meas}}{Q_{std}}}{f_{ref}/\frac{K_{ref}}{Q_{std}}}. \quad (9)$$

The $Q_{std}$ in the numerator and denominator cancel each other, giving:

$$\text{Accuracy}_{meter} = \left(\frac{K_{ref}}{K_{nom,meas}}\right)\left(\frac{f_{meas}}{f_{ref}}\right). \quad (10)$$

Finally, substituting a form of equation (5), $K_{nom, meas} = K_{meas}/\text{Accuracy}_{cal}$, into equation (10) gives a form of the accuracy equation that can be used in a proving program or a proving circuit to determine in the field the accuracy of the mechanical output, or the register, of the main rotor:

$$\text{Accuracy}_{meter} = \left(\frac{K_{ref}}{K_{meas}} \text{Accuracy}_{cal}\right)\frac{f_{meas}}{f_{ref}}. \quad (11)$$

Thus, the accuracy of the measuring rotor of the self-proving gas turbine meter is shown to be the product of the ratio of the K factor of the reference rotor to the K factor of the measuring rotor, multiplied by the ratio of the frequency of the measuring rotor to the frequency of the reference rotor, multiplied by the accuracy of the measuring rotor at the time of calibration. When the output of the gas turbine meter is measured electronically, the $\text{Accuracy}_{cal}$ is one. The output frequencies are measured at particular meter conditions while the meter is in service in the field. The K factors and the accuracy were determined during factory calibration of the meter for various flow conditions of the gas turbine meter and those for the particular conditions existing at the time the frequencies are measured can be selected and used.

In the derivation of the self-proving gas turbine meter accuracy, it was assumed that the volumetric flowrate at the measuring rotor equaled the volumetric flowrate at the reference rotor. This assumption is correct only if the static pressure and static temperature at the two rotors are equal. For a turbine meter, the gas velocity at the rotor only reaches about 105 feet per second. Thus the maximum Mach number, that is the ratio of the gas velocity to the local speed of sound, is about 0.1. In this range of Mach numbers, since the two rotors are relatively close to each other, the static pressure and static temperature will be equal at each rotor if the annual passage areas in front of the rotors are approximately equal. Under this assumption the self-proving gas turbine meter accuracy equation can be independent of pressure and temperature. This simplifies the measurements which must be taken to determine the accuracy of a meter, reduces the potential for component malfunction and resulting error and simplifies the calculations for determining accuracy.

In accordance with another aspect of the invention relating to the self-proving gas turbine meter, the second flow straightener includes a central housing and a plurality of fins extending radially and outwardly from the housing. A cylindrical reference flow guide is located on the radial ends of the fins. This flow guide also extends over the reference rotor which is mounted at the downstream ends of the fins. These components and associated bearings and other components form an integral reference cartridge which can be removed intact from the gas turbine meter. This structure enables the reference rotor to be calibrated independently of the meter in which it is to be mounted and used. Thus, the reference rotors of reference cartridges can be calibrated at the factory, stored for future use and installed in self-proving gas turbine meters without having to be recalibrated for each meter.

Rotor Bearing Protection

In accordance with still another aspect of this invention relating to meters both with and without a second rotor, the measuring rotor of a gas turbine meter is mounted within and at the upstream end of a measuring cartridge. The measuring rotor includes a cylindrical rotor hub, a plurality of turbine blades mounted on the rotor hub and a front face which supports the rotor hub. The front face of the rotor is solid over its surface so that gas, and any contaminants carried by the gas, cannot pass through it during normal operation of the gas turbine meter.

Additionally, the measuring cartridge includes a cylindrical chamber concentric with the measuring rotor which has an open upstream end and has a downstream end. The outside diameter of the cylindrical chamber is slightly less than the inside diameter of the rotor hub. The axial length of the cylindrical chamber is such that its upstream end extends beneath at least a portion of the rotor hub when the measuring rotor is mounted within the measuring cartridge. The outside surface of that portion of the cylinder downstream of the rotor hub which is in the vicinity of the rotor hub is continuous and smooth so contamination cannot accumulate near the clearance between the rotor hub and the cylinder.

Each cylindrical chamber includes measuring rotor bearings and a shaft for connecting these bearings to the measuring rotor. A bearing holder for the measuring rotor bearings is mounted within the cylindrical chamber, downstream of the location where the rotor shaft is connected to the measuring rotor. The downstream ends of the cylindrical chamber and the bearing holder are closed to the normal flow of gas through the gas turbine meter when the bearings are mounted within the bearing holder. Additionally, a structure is provided to exert positive pressure on the measuring cartridge housing to form a seal at its upstream end to control the path of the flow of gas.

Meter Accuracy Adjustment

Gas turbine meters have typically been constructed of a metal cylindrical housing having a measuring cartridge mounted within it. The measuring cartridge normally includes at least a measuring rotor, its rotor bearings and a coupling for interconnecting the measuring rotor to the mechanical register mounted on top of the measuring cartridge. Gas turbine meters manufactured in North America normally have measuring cartridges which are removable from the top of the meter housing, along with the mechanical register, without removing the total meter from the pipeline in which it is installed.

Another aspect of this invention relates to a simplified means for adjusting the accuracy of both the self-proving gas turbine meter of this invention and gas turbine meters without a second rotor. The measuring rotor is mounted at the upstream end of the measuring cartridge with the upstream tips of turbine blades on the measuring rotor extending toward the inlet port. The measuring cartridge housing has an interior surface, forming the flow path for the gas to be measured, having an axial cross section which over a predetermined length from its upstream end is conically tapered away from the turbine blades. Through testing it has been found that the conical cross section must have an angle in the range of between about 5° and about 7° to allow for adjustment of the accuracy of the gas turbine meter, while obtaining a satisfactory accuracy curve at higher flowrates. Using the principles of this aspect of this invention, the clearance between the upstream tips of the turbine blades and the tapered interior surface of the cartridge is adjusted within a range of approximately 0.010 inches to approximately 0.045 inches.

A mechanism is provided to securely, axially locate the position of the upstream tips of the turbine blades with respect to the tapered interior surface of the cartridge to adjust the accuracy of the meter. By way of example only, in the preferred embodiment of this invention one or more shims is placed between the rotor and the balance of the rotor shaft assembly against which the rotor is mounted before the rotor is fastened to the rotor shaft. The number of the shims of equal width put in place can be varied to change the position of the upstream tips of the turbine blades with respect to the tapered interior surface of the measuring cartridge, thereby adjusting the low flow rate end of the accuracy curve of the meter.

This invention does not reside in any one of the features of the gas turbine meters and method which are disclosed above and in the Description of the Preferred Embodiments and claimed below. Rather, this invention is distinguished from the prior art by its particular combination of features of the gas turbine meters, and of the steps of the method disclosed. Important features of this invention have been disclosed in the detailed description of the preferred embodiments of this invention which are shown and described below, to illustrate the best mode contemplated to date of carrying out this invention.

Those skilled in the art will realize that this invention is capable of embodiments which are different from those shown and that the details of the structure of the gas turbine meters and the method can be changed in various manners without departing from the scope of this invention. Accordingly, the drawings and description are to be regarded as illustrative in nature and are not to restrict the scope of the invention. Thus, the claims are to be regarded as including such equivalent gas turbine meters and methods as do not depart from the spirit and scope of this invention.

BRIEF DESCRIPTION OF THE DRAWINGS

For a more complete understanding and appreciation of this invention and many of is advantages, reference will be made to the following, detailed description taken in conjunction with the accompanying drawings wherein.

DESCRIPTION OF PREFERRED EMBODIMENTS

Figure 1:
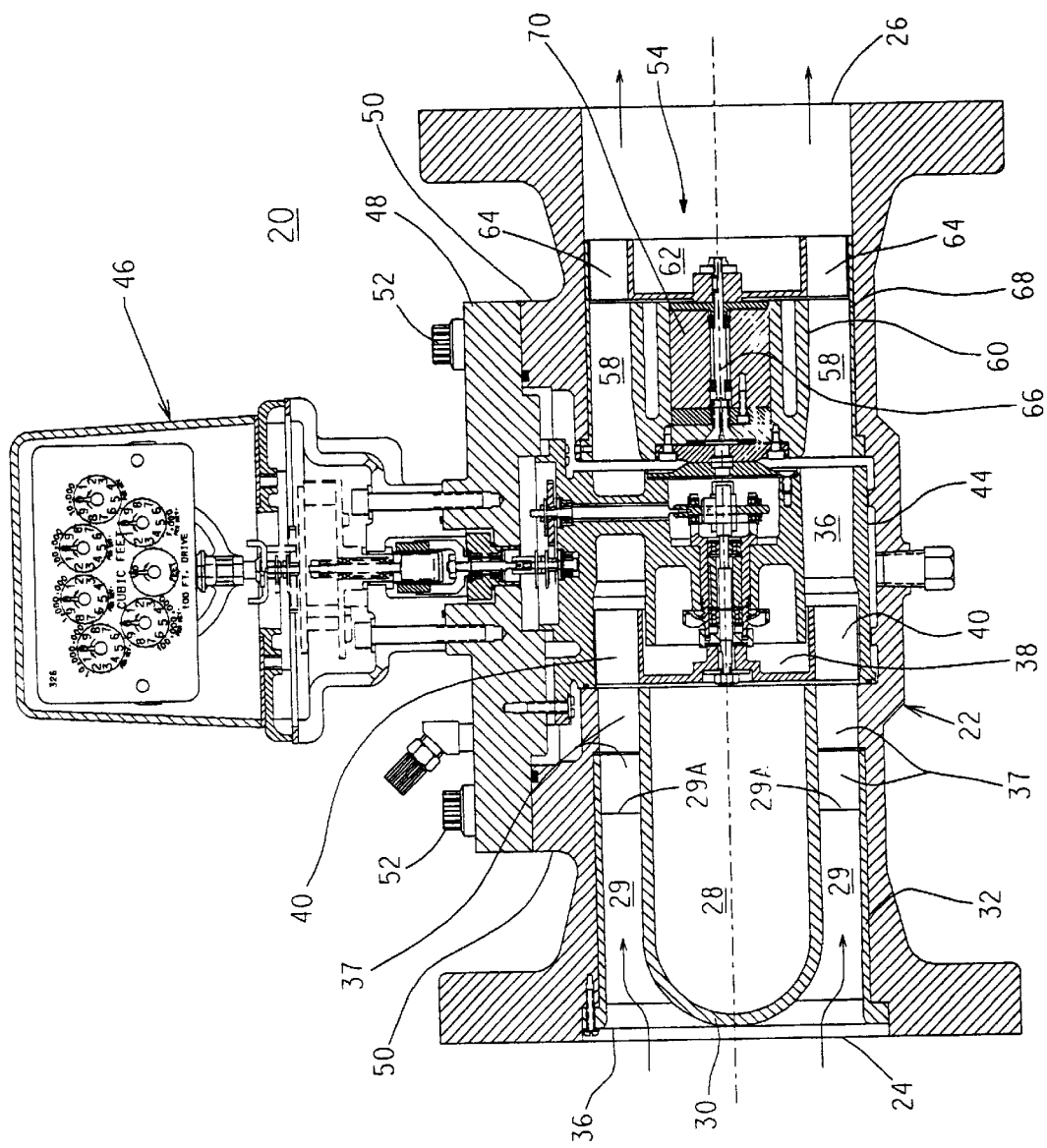
FIG. 1 is a sectional, side view of a gas turbine meter incorporating features of this invention.

Referring to the drawings, identical reference numbers and letters designate the same or corresponding parts throughout the several figures shown in the drawings.

Figure 2:
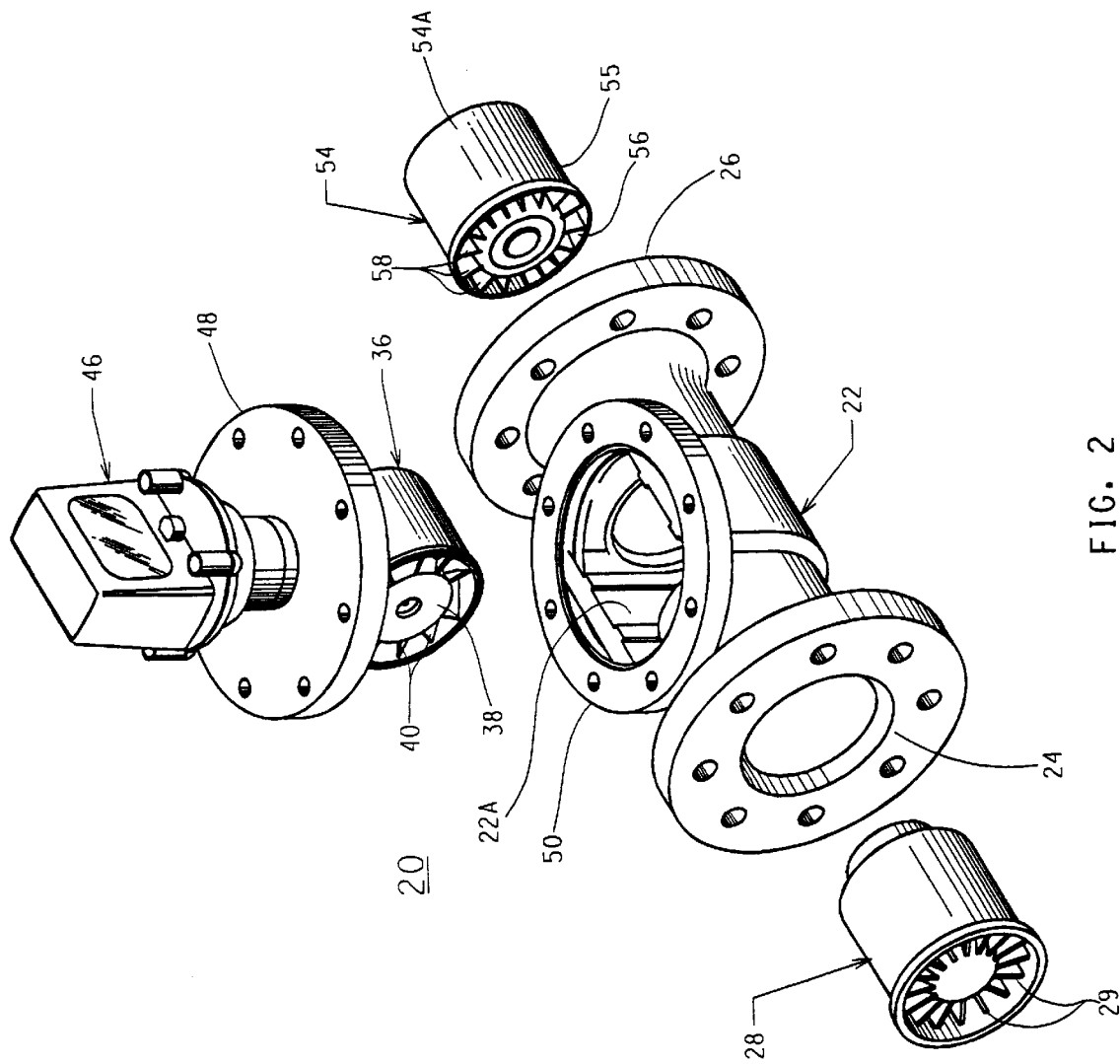
FIG. 2 is an exploded, perspective view of a gas turbine meter incorporating features of this invention.

FIG. 1 and FIG. 2 show the basic components of a gas turbine meter which is constructed in accordance with this invention. A gas turbine meter 20 comprises a metal housing 22 having an inlet port 24 and an outlet port 26. The housing 22 is normally constructed of metal such as aluminum and is designed to withstand the pressures to which it is expected to be submitted when installed in a gas transmission or distribution line.

Figure 4:
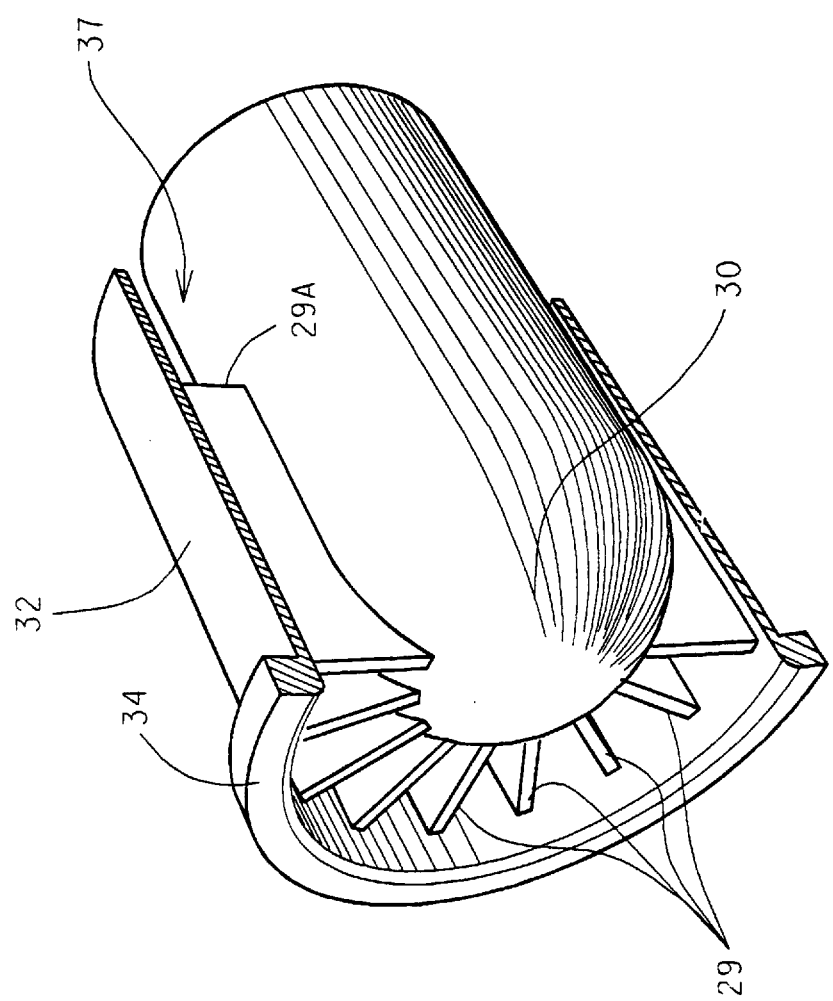
FIG. 4 is a perspective view, partially cut away, of an upstream flow straightening assembly.

The gas turbine meter 20 includes an inlet flow straightening assembly 28 adjacent the inlet port 24 which has a number of vanes 29 forming passageways that reduce or eliminate flow disturbances produced in the pipeline in which the gas turbine meter 20 is installed. Referring to FIG. 4, along with FIG. 1, the vanes 29 are mounted on a hub 30 which has a bullet-shaped frontal portion adjacent the inlet port 24. A flow guide or shroud 32 is mounted on the radial ends of the vanes 29 and extends beyond downstream ends 29A of the vanes 29 as shown in both FIG. 1 and FIG. 4. For a four-inch gas turbine meter constructed in accordance with this invention, the shroud 32 extends about one inch beyond the downstream ends 29A of the vanes 29. The shroud 32 has a flange 34 at its upstream end. The flange 34 fits into an area which has been cut away from the inlet area of the housing 22 as seen in FIG. 1. The flange 34 is fastened to the meter housing 22 by a series of screws, one of which is shown as screw 36.

The performance of the flow straightening assembly 28 is improved by machining the external surface of the shroud 32 and the internal surface of the housing 22 to close tolerance to provide better concentricity with the measuring rotor 38 of the gas turbine meter 20. Good results have been obtained by using 16 vanes for removing flow disturbances from the flow of the gas into the inlet port 24 of the gas turbine meter 20.

The hub 30 extends beyond the downstream ends 29A of the vanes 29 and beyond the downstream end of the shroud 32 to a location where it terminates adjacent the upstream end of a measuring cartridge 36. A mixing chamber 37 is formed between the ends 29A of the vanes 29 and measuring rotor 38 which is a component of a measuring cartridge 36. The mixing chamber 37 allows small eddies created by the fins of the inlet flow guide to become diminished before reaching measuring rotor 38. The mixing chamber 37 also allows the flow of gas within the flow straightening assembly 28 to become slightly turbulent before reaching the measuring rotor 36. This helps to reduce a hump which occurs in the accuracy curve of the gas turbine meter at low flowrates and at low operating pressures when the gas turbine meter 20 is being calibrated. However, flow disturbances, such as swirl, within the pipeline preceding the gas turbine meter 20 are reduced by increasing the length of the vanes 29. Thus, actual vane length is a compromise between minimizing the effects of upstream swirl and reducing the hump in the accuracy curve. For a four-inch meter built in accordance with this invention, the design of the flow straightening assembly 28 was optimized by including vanes 29 which were three inches in length and having a mixing chamber 37 which was two inches long. However, it was found that the length of the mixing chambers for six-inch and eight-inch meters were optimal at one inch for each. It is believed that a two-inch mixing chamber was required for the four-inch meter because much less friction is built into the four-inch meter so that the hump in the accuracy curve was more exaggerated in the four-inch meter than in the six-inch meter or the eight-inch meter.

The measuring cartridge 36 is normally mounted within a central chamber 22A of the housing 22. The measuring rotor 38, mounted on the upstream end of the measuring cartridge 36, includes a number of radially extending turbine blades 40 which cause it to rotate in one direction at a speed approximately proportional to the velocity of gas flowing through the housing 22 and the inlet flow straightening assembly 28.

Figure 5:
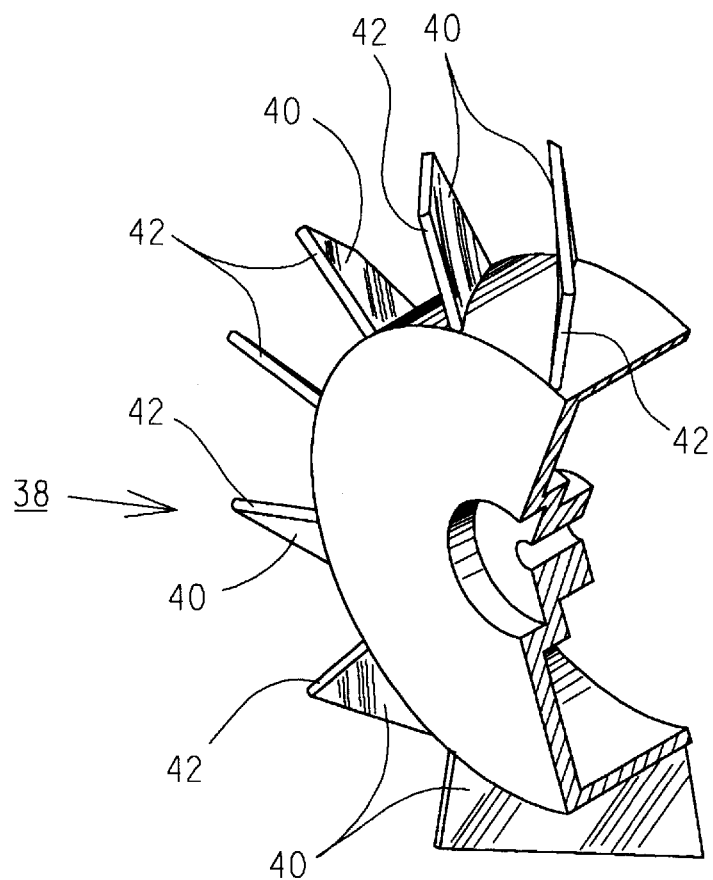
FIG. 5 is a perspective view, partially cut away, of a measuring rotor.
Figure 6:
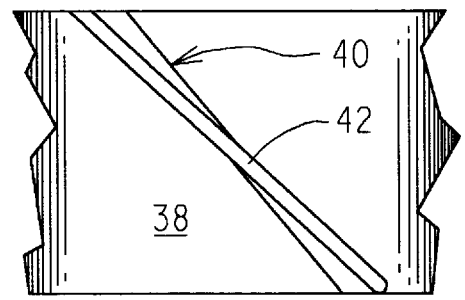
FIG. 6 is a partial top view of a measuring rotor showing one of its turbine blades.

The measuring rotor 38 is shown in more detail in FIG. 5 and FIG. 6. The turbine blades 40 have a helical twist which reduces flow interaction between the blades and thus improves the performance of the gas turbine meter 20. For turbine blades having a 45° angle, the helical twist has a lead of 10.542 inches and a mean helix angle of 45°. The capacity of the rotor 38 can be increased by changing the rotor blade angle to 30°. Each of the turbine blades 40 has a radius on its leading edge which serves to reduce the thrust load on the rotor blades and helps to prevent dirt from accumulating on the front of the rotor. The rotors, including rotor blades, can be machined from material such as aluminum, as in the preferred embodiment of this invention, or from other metals such as steel or stainless steel, or produced out of molded plastic or manufactured through the use of any other process desired by those skilled in the art. Where inductive proximity sensors are used to sense rotation of the rotors as set forth below, the rotors must be manufactured out of an appropriate metal rather than a plastic material.

Referring particularly to FIG. 1, the measuring rotor 38 is connected through a series of gears and couplings to a register 46 which provides a mechanical indication on a set of dials of the amount of gas flowing through the gas turbine meter 20. As shown in FIG. 2, both the measuring cartridge 36 and the register 46 are fastened to a top plate 48. The housing 22 includes a circular flange 50 which corresponds in diameter to the top plate 48. Both the top plate 48 and the flange 50 have a series of holes in them which enable them to be fastened together through the use of a set of bolts such as bolts 52 shown in FIG. 1.

The gas turbine meter 20 of this invention also includes a reference cartridge 54 with a flow straightening assembly 56 having a number of vanes 58. In accordance with one aspect of this invention, the inlet flow straightening assembly 28 and the flow straightening assembly 56 of the reference cartridge 54 form constant area passages having areas which are approximately equal to one another. The flow straightening assembly includes the vanes 58 attached to a hub 60, as well as a shroud 68 mounted on the radial ends of the vanes 58. The vanes 58 extend the total length of the hub 60. Thus, there is no mixing area between the end of the vanes and the front of reference rotor 62 at the downstream end of the hub 60. Having the vanes 58 along the full length of the hub 60 produces the most flow conditioning for the length of the hub 60. No mixing chamber is required between the ends of the vanes and the reference rotor 62 because rotation of the reference rotor is detected electronically. Non-liniaries resulting during calibration from a large hump in the K factor curve due to the lack of a mixing chamber are corrected electronically. The gas turbine meter 20 is calibrated at five or more flowrates over the operating range of the meter and at two or more operating pressures, and the corresponding K factors for any given flow conditions are recorded. While the resulting performance curves are not linear, they are known and repeatable and thus can be factored into the electronic calculation of gas flow determined as a result of the measured rotation of the reference rotor 62.

It is the flow straightening assembly 56 which decouples the reference rotor 62 from measuring rotor 38. As a result, the reference rotor 62 rotates independently of the measuring rotor 38. Like the flow straightening assembly 28, the flow straightening assembly 56 has 16 vanes. It is molded out of 30% glass-filled acetal.

In accordance with another aspect of this invention, a shroud 68 extends over the turbine blades 64 of a reference rotor 62 which is mounted by a shaft 66 at the downstream end of reference cartridge 54. Thus, the critical flow area of the annular passage about the rotor blades 64 and the rotor tip clearance is controlled by the shroud 68. They do not depend on the meter housing 22. This allows the reference rotor 62 to be calibrated separately outside the meter and later installed into a meter housing or moved from one meter housing to another without affecting the calibration of the reference rotor 62.

Figure 8:
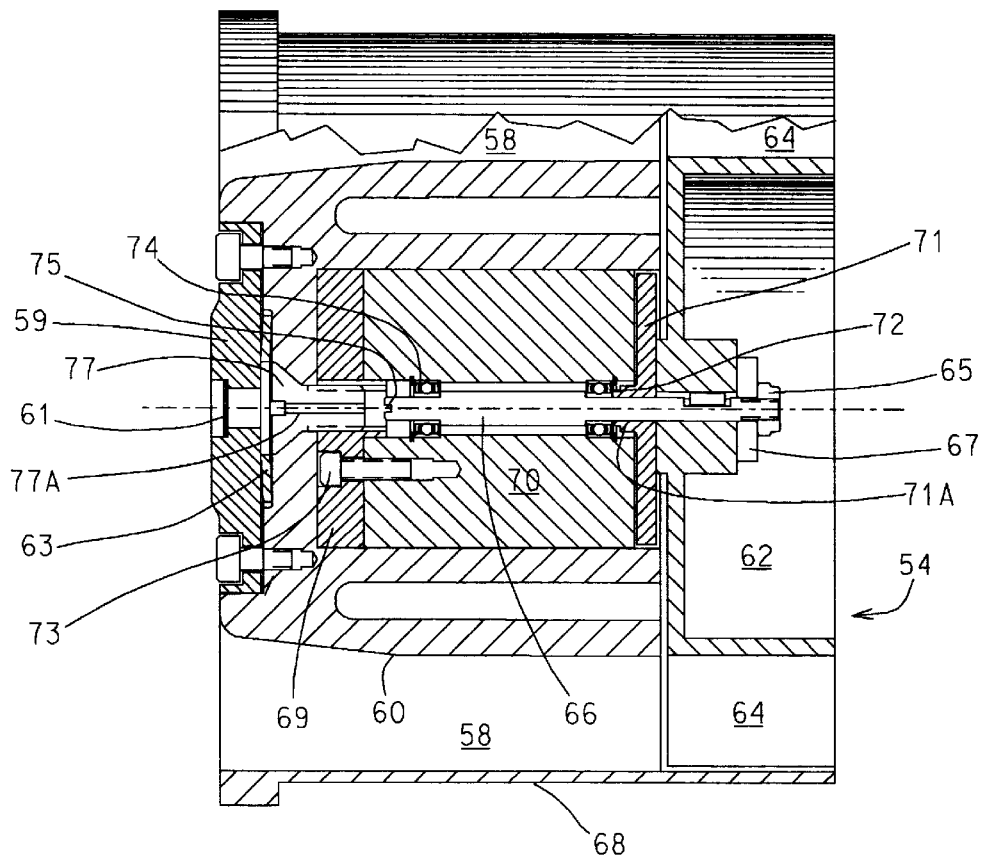
FIG. 8 is a partial, sectional side view of a reference cartridge.
Figure 9:
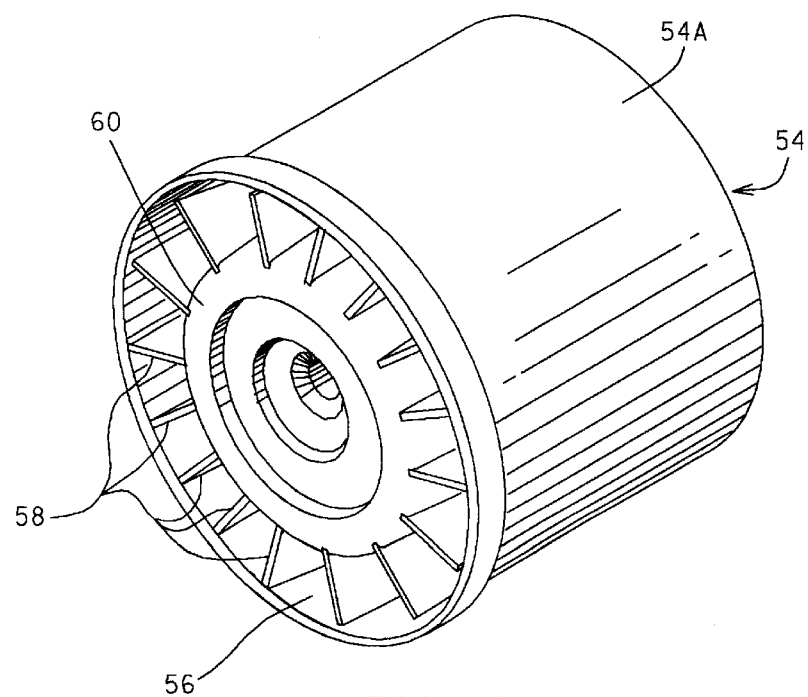
FIG. 9 is a perspective view of a reference flow straightening assembly.
Figure 10:
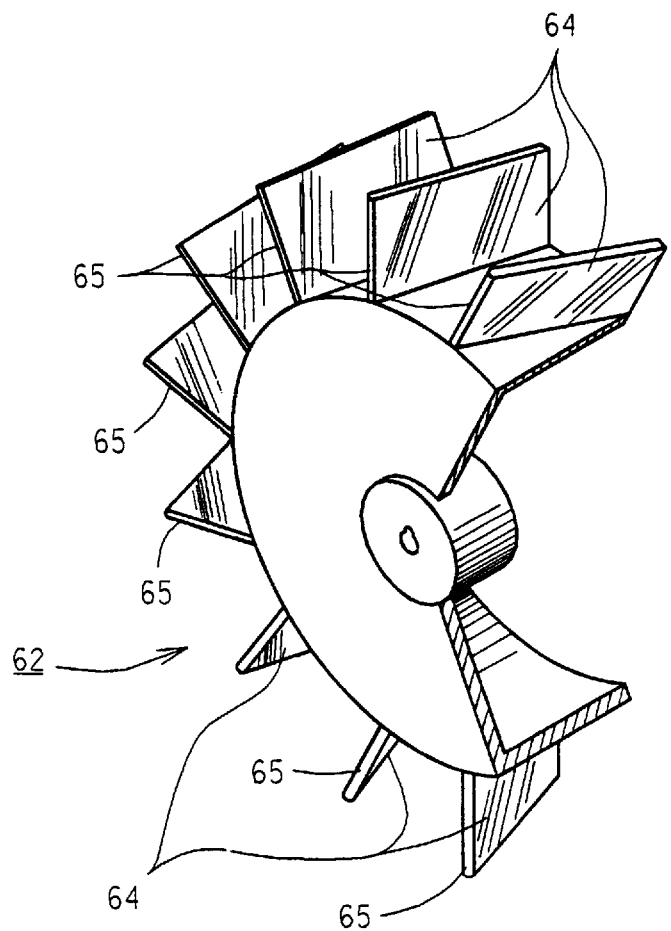
FIG. 10 is a perspective view, partially cut away, of a reference rotor.
Figure 11:
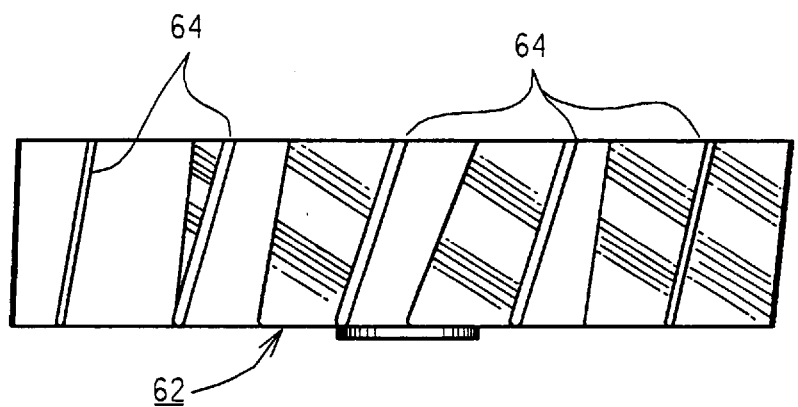
FIG. 11 is a top view of the reference rotor showing its turbine blades.

The structure of the reference rotor can be better understood by referring to FIG. 10 and FIG. 11, along with FIG. 8. The pitch of the turbine blades 64 of the reference rotor 62 is such that they cause the reference rotor to rotate in a direction opposite to the direction of rotation of the measuring rotor 38. The angle of orientation of the turbine blade 64 can be chosen so that the reference rotor 62 rotates at a speed which is less than the speed of rotation of the measuring rotor 38. The objective normally is to create less wear on the reference rotor 62 and its bearings than on the measuring rotor 38 and its bearings so that there is a lesser potential for the reference rotor 62 to fail than there is for the measuring rotor 38 to fail. In four-inch meters manufactured in accordance with this invention, the reference rotor blade angle which maximizes bearing life was determined to be 18.5°. This blade angle has been chosen for six-inch and eight-inch meters, as well. It is contemplated that the optimum blade angle for meters of different size will vary in a range both somewhat greater and somewhat lesser than 18.5°. The reference rotor 62 having a blade angle of 18.5° rotated at a speed one-third as fast, for a given gas flow volume, as a measuring rotor 38 having turbine blades mounted at a 45° angle. Where a measuring rotor has turbine blades set at a 30° angle, a reference rotor having turbine blades set at 18.5° would rotate about one-half as fast as the measuring rotor.

The reference rotor 62 in the preferred embodiment was chosen to have the same number of blades, fourteen, as the measuring rotor. Like the measuring rotor 38, the reference rotor 62 can be machined from a metal such as aluminum or steel or stainless steel or molded from plastic or otherwise manufactured in any other way chosen by those skilled in the art. As indicated above, the rotor must be made out of an appropriate metal when an inductive sensor is used to sense its rotation. Referring to FIG. 10, the turbine blades 64 have rounded leading edges 65 similar to the leading edges 42 of the measuring rotor turbine blades 40.

As shown in FIG. 8, the reference rotor 62 is attached to rotor shaft 66 by a bolt 65 housing screwthreads which match those in the downstream end of rotor shaft 66. A washer 67 is placed between the bolt 65 and the internal hub of the reference rotor 62. A bearing holder 70 is installed within the hub 60 to retain bearings 72 and 74 which support the shaft 66 and thus the reference rotor 62. The probability of malfunction of the reference cartridge 54 should be kept small relative to that of the measuring cartridge 36. Thus, the bearing system of the bearings 72 and 74 should be of higher reliability than the bearings 76 and 78, shown in FIG. 7, used to support the measuring rotor 38. In one preferred embodiment of this invention, reference rotor bearings 72 and 74, shown in FIG. 8, were hybrid ceramic bearings having silicon nitride balls and phenolic retainers and were permanently lubricated with low viscosity grease NYE Rheolube 719-M manufactured by NYE Lubricants, Inc. of New Bedford, Mass. 02742. Phenolic retainers are said to require less lubricant to operate properly than conventional stainless steel ribbon retainers. Having the bearings 72 and 74 permanently lubricated also reduces the probability of malfunction of the reference cartridge since maintenance is not required, and the bearings 72 and 74 cannot malfunction due to a failure to replenish the supply of oil to the bearings. Suitable hybrid ceramic bearings are manufactured by the New Hampshire Ball Bearings Company of Bedford, N.H.

It is contemplated that a magnetic bearing assembly incorporating an active, magnetic bearing may be an alternative, long life bearing for the reference rotor 62.

The inner bore of the hub 60 must be machined to close tolerance so that the bearing holder 70 has a close fit with it. This ensures that there is true concentricity between the reference rotor 62 and the remaining components of the reference cartridge 54. The bearing holder 70 is made of an appropriate solid metal such as aluminum which is also machined to close tolerances. It includes a central, cylindrical orifice which retains the bearings 72 and 74 and the reference rotor 66. A bearing holder cap 69 is installed on the upstream end of the bearing holder 70, while a dust shield 71 is installed on its downstream end to rotate with the rotor 62. The bearing holder cap 69 has a shoulder extension which fits within the central orifice in the bearing holder 70. The hole at the center of the bearing holder cap 69 has screwthreads cut within it. The bearing holder cap 69 is fastened to the bearing holder 70 by three bolts, one of which is shown as bolt 73. The upstream end of the hub 60 is closed by cover plate 59 having a central orifice in which a breathing cartridge 61 is mounted. A Bellvile washer 63 is mounted between the cover plate 59 and the upstream end of the hub 60. The function of the cover plate 59, breathing cartridge 61 and Bellvile washer 69 was more fully explained below. The dust shield 71 has a double shoulder 71A which fits into bearing holder 70. Part of the double shoulder 71A fits between the race of the bearings 72 and rotor shaft 66, causing the dust shield 71 to rotate with the rotor 62. A screwdriver can be inserted through the hole in the bearing holder 69 and into a slot 75 at the upstream end of the rotor shaft 66. An end bolt 77 is inserted through the upstream end of the hub 60 and into the screwthreads in the bearing holder cap 69 to hold the bearing holder 70 in place against the upstream end of the hub 60 and to prevent it from rotating with the reference rotor 62. This end bolt 77 also aids in preventing contamination from reaching bearing 74. The end bolt 77 has a small central orifice 77a which can relieve any heat and pressure which may build up due to the rotation of the bearings 72 and 74, with a minimal risk of contamination reaching the bearings.

Figure 3:
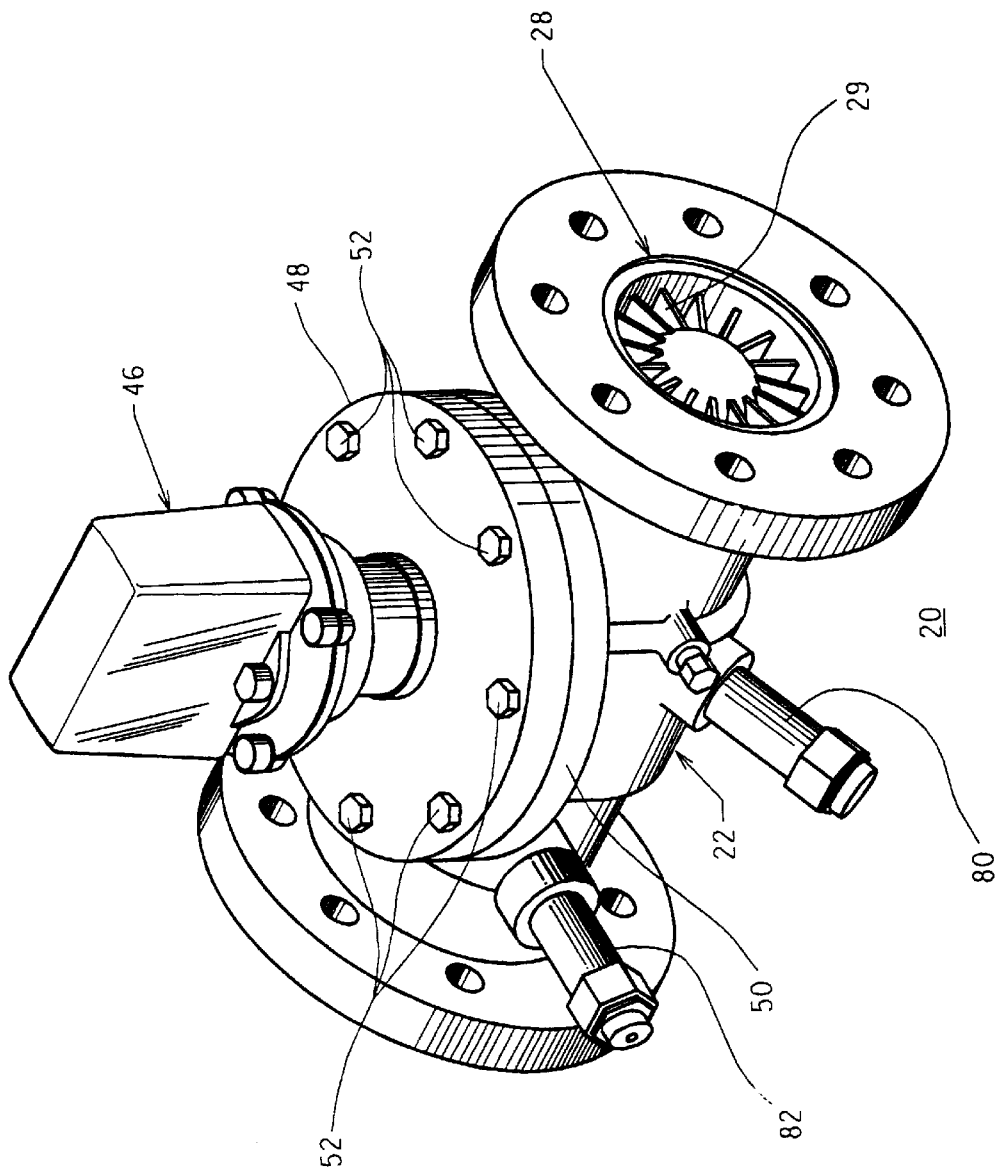
FIG. 3 is a perspective view of the reverse side of a gas turbine meter incorporating features of this invention.

Since the reference bearings 72 and 74 are self-lubricated, there is no need to feed lubrication to them as there is for the main rotor bearings 76 and 78 as described later with respect to FIG. 7. The total bearing holder assembly, including the bearing holder cap 69, the bearing holder 70, the dust shield 71 and the end bolt 77 form a substantially solid structure which surrounds the reference rotor bearings and protects them from contamination, while ensuring that the bearings, and thus the reference rotor 62, are firmly mounted. To enable the volume of the gas turbine meter 20 to be determined electrically, the meter must include a measuring signal generator responsive to the rotation of the measuring rotor 38 to generate a measuring signal comprising a series of pulses having a frequency proportional to the speed of rotation of the measuring rotor. Similarly, to enable the volume of gas flow through the gas turbine meter 20 to be measured by the reference rotor 62, the gas turbine meter 20 must include a reference signal generator which responds to the rotation of the reference rotor 62 to generate a reference signal comprising a series of pulses having a frequency proportional to the speed of rotation of the reference rotor. Any type of signal generator which performs this function can be used to measure the speed of rotation of the measuring rotor 38 and the reference rotor 62. Suitable signal generators can use permanent magnet hall effect sensors, Whiegand pulsors which respond to a change in magnetic field, inductive proximity devices, infared detectors and the like. Those skilled in the art will recognize that some of these can respond to rotation of turbine rotor blades past them. These detectors may also respond to timing disks or some other mechanisms which rotate with a measuring rotor through the use of various gears and couplings or by using holes within or items mounted on the measuring rotor structure, itself. In a preferred embodiment of this invention, inductive proximity sensors were chosen to detect the speed of rotation of the rotors. Referring to FIG. 3, an inductive proximity sensor generates a measuring signal having a frequency proportional to the speed of rotation of the measuring rotor 38 is contained in housing 80 which is mounted in the meter housing 22 in an area adjacent the turbine blades 40 of the measuring rotor 32. An inductive proximity sensor which generates a reference signal having a frequency which is proportional to the speed of rotation of the reference rotor 62 is contained in housing 82 which is mounted in an area of meter housing 22 which is adjacent the turbine blades 64, as shown in FIG. 1. The inductive proximity sensors are set at an angle of 135° from one another to enable the measuring cartridge to be removed from the top of the meter 20.

The inductive proximity sensor detects the tips of rotor blades as they pass within the detection range of the sensor. The use of inductive proximity sensors has the following advantages over other methods of detecting the speed of rotation of the rotor:

1. If a rotor blade is bent or missing, the sensor will detect the problem. In other types of rotation sensors, such as those identified above, bent or missing turbine blades go undetected.

2. This method of detection does not create any drag on the rotor.

The type of sensor used in the preferred embodiment of this invention has a maximum frequency of approximately 1500 Hz. It is installed in the meter housing in such a manner that it can be removed for repair without removing the measuring cartridge 36. Additionally, an inductive proximity sensor is not affected by dirt or liquids in the gas stream being measured. A suitable inductive proximity sensor is model NJ 1.5 10GM-N-Y0741 which is manufactured and distributed by Pepperl & Fuchs Inc. located in Twinsburg, Ohio 44087-2202.

Figure 12:
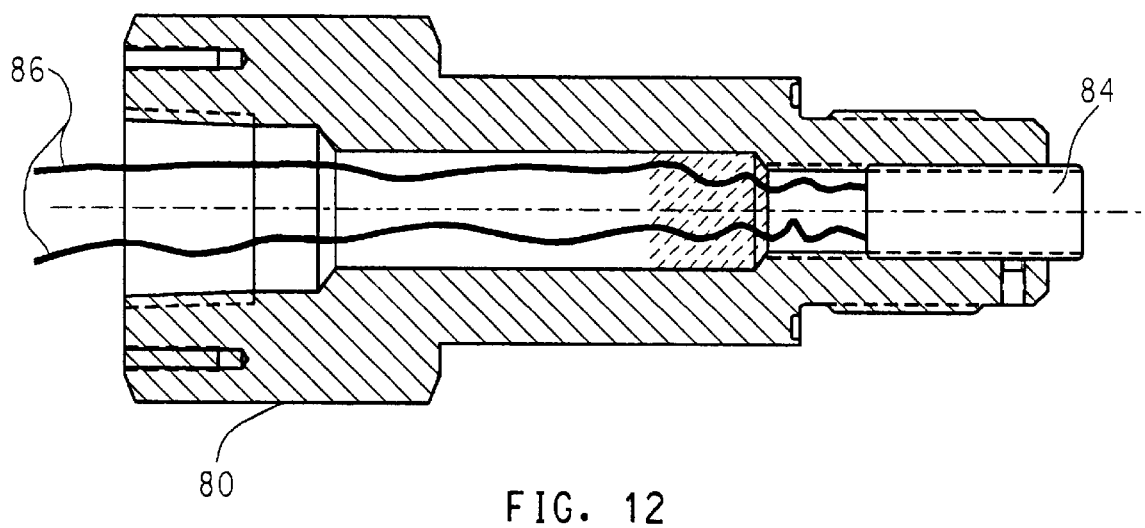
FIG. 12 is a sectional view of a housing for mounting an electromagnetic proximity sensor for gas turbine blades.

One type of installation of a proximity sensor can be seen by referring to FIG. 12, along with FIG. 3. The housing 80 has a proximity sensor 84 mounted within it. Electrical leads 86 extend from the proximity sensor 84 to a signal processor which processes pulses generated as the turbine blades 40, shown in FIGS. 1 and 2, of the measuring rotor 38 pass the proximity sensors. The sensor is screwed into the sensor housing and then epoxy is poured into housing to make it pressure tight.

The basic operating premise of the self-proving gas turbine meter is that the volumetric flowrate determined from the angular speed of the reference rotor is the actual flowrate. In other words, the reference rotor is assumed to remain 100% accurate. Thus, factors influencing the performance of the upstream measuring rotor, such as changes in mechanical friction and flow disturbances such as swirl, asymmetric velocity profile and pulsating flow, should not influence the downstream rotor. Additionally, it is assumed that after extended use in the field, the reference rotor performance will not change from initial calibration. That is, the reference rotor can perform the function of a standard meter used in proving other meters. This assumption is justified by substantially reducing the probability of reference rotor malfunction and error compared to the probability of measuring rotor malfunction through the following design features:

1. The reference rotor is free running without any mechanical loads produced by the addition of a worm and worm gear, a gear train, and a mechanical index or corrector normally driven by a measuring rotor.

2. The extra flow conditioning provided by the reference flow straightener reduces the probability of reference rotor error due to the upstream flow disturbances.

3. The reference rotor can be designed to rotate at a slower speed than the measuring rotor because of a smaller rotor blade angle. Thus there is less wearing of the rotor bearings because of the lower rotor speeds and lower thrust loads.

4. The ball bearings for the reference rotor can be constructed of silicon nitride, a ceramic material that does not wear as rapidly as stainless steel bearings typically used for more heavily loaded measuring rotors. These hybrid ceramic bearings have at least three times the operating life of conventional stainless steel bearings. In addition, this type of bearing is permanently lubricated so periodic maintenance is not required and malfunction will not occur due to failure to perform regular maintenance. Also, a substantially solid structure can surround the self-lubricated bearings to protect them from contamination.

Another option for the reference rotor cartridge is to incorporate an actively controlled magnetic bearing system. This system would further reduce the probability of malfunction of the reference cartridge because magnetic bearings do not wear and are not effected by contaminates in the gas stream.

Signal Processor

Figure 13:
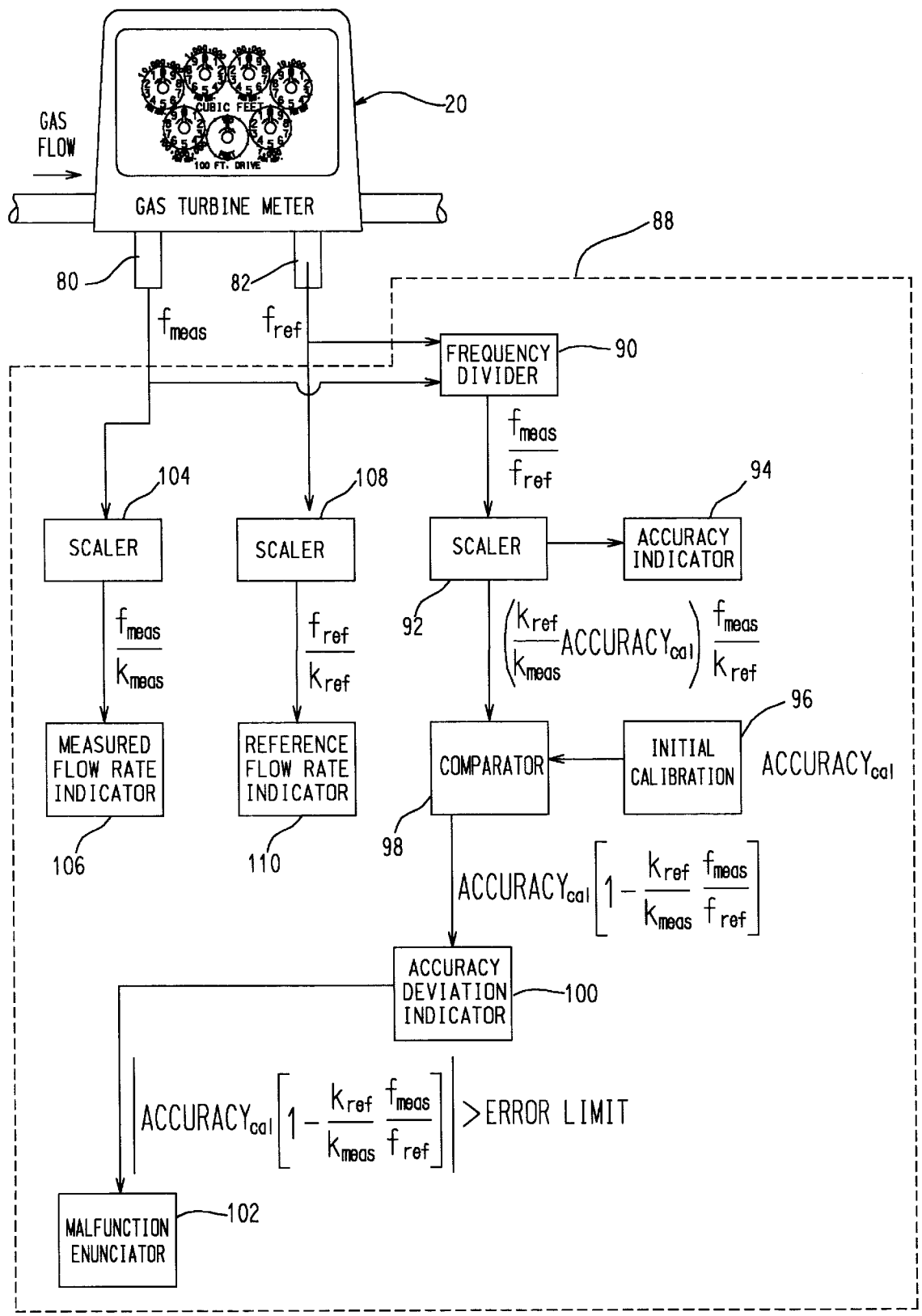
FIG. 13 is a block diagram of a signal processor used in accordance with this invention.

A block diagram of signal processor 88 constructed in accordance with one aspect of this invention is shown in FIG. 13. Measuring signals $f_{meas}$ and reference signals $f_{ref}$ generated by the proximity sensors located in the housings 80 and 82, respectively, may first be amplified and otherwise enhanced so they can be used by the type of signal processor chosen. By way of example, the signals may be shaped in any desirable manner, such as by causing them to become rectangular pulses. The measuring signals and reference signals are then coupled to a frequency divider 90 within the signal processor 88. The frequency divider 90 determines the frequencies of these signals and divides $f_{meas}$ by $f_{ref}$. This quotient, $f_{meas}/f_{ref}$, is multiplied according to equation (11), above, through the use of a scaler 92 by $(K_{ref}/K_{meas})$ Accuracy$_{cal}$ for the particular operating conditions of the gas turbine meter 20 existing at time of measurement. As seen in equation (11), the resulting:

$$\left( \frac{K_{ref}}{K_{meas}} \text{Accuracy}_{cal} \right) \frac{f_{meas}}{f_{ref}}$$

is a measurement of the accuracy of the gas turbine meter 20. This accuracy can be displayed or recorded on an accuracy indicator 94 such as a meter or a chart or on data storage media of a computer memory.

Gas line operators want to know, and they are required by some state laws and regulations to periodically determine, if components of a gas turbine meter have worn to an extent the meter becomes sufficiently inaccurate that is must be replaced. Thus, the signal processor 88 includes an initial calibration function 96 which produces an indication of the initial, calibrated accuracy of the mechanical output gas turbine meter 20, Accuracy$_{cal}$, for the operating conditions at the time of the current measurement. A comparator 98 compares the initial accuracy of the turbine meter 20 with its measured accuracy. In our preferred embodiment the comparator 98 subtracts the measured accuracy produced by scaler 92 from Accuracy$_{cal}$, obtained from the initial calibration function 96, to produce an error indication:

$$\text{Accuracy}_{cal} \left[ 1 - \frac{K_{ref}}{K_{meas}} \frac{f_{meas}}{f_{ref}} \right].$$

An accuracy deviation indicator 100 determines whether the measured accuracy has deviated in either direction, by becoming higher or lower than the initial accuracy shown in FIG. 13 as the absolute value of the error indication from comparator 98, by an amount equal to more than a preselected deviation. If the accuracy has deviated by more than the preselected amount a malfunction annunciator 102 is actuated to inform the operator of the pipeline of the deviation on an appropriate meter or chart or on data storage media.

Additionally, the signal processor 88 can indicate the current flowrate of the gas turbine meter 20 as measured by both the measuring rotor 38 and the reference rotor 62 shown in FIG. 1. The measuring signal $f_{meas}$ is coupled to scaler 104 which divides its frequency by the K factor, $K_{meas}$, of the measuring rotor 38 applicable at the prevailing operating conditions to obtain the flowrate in accordance with formula (4) above. This flowrate can be displayed or recorded by a measured flowrate indicator 106. The flowrate itself can be shown numerically or on a graph or by a needle of an instrument, or the flowrate can be shown in the same manner as a percent of the capacity of the gas turbine meter 20. This measurement of the flowrate may be used initially to set the various flowrates, for the current operating pressure of the meter being tested, at which the accuracy of the meter is to be proved.

Similarly, the reference signal $f_{ref}$ is coupled to a scaler 108 which divides the frequency of this signal by the K factor of the reference rotor, that is $K_{ref}$, for the current operating conditions of the gas turbine 20 to determine the gas flowrate indicated by the reference rotor 62. The flowrate measured by the reference rotor 62 can also be displayed by reference flowrate indicator 110 in its numerical terms or as a percentage of the capacity of the gas turbine meter 20. Furthermore, where the measuring signals and/or the reference signals are generated by a sensor, such as an electromagnetic inductive proximity sensor, which detects the passing of each turbine blade of a rotor, the resulting signals can be displayed on an appropriate chart or screen so that they can be examined.

As an alternative to inserting individual values into the signal processor by hand during each test, a table of K factors and the accuracy at calibration for the various flow conditions can be stored in a computer data base, if available, and called up automatically when flow conditions are determined at the time of measurement. Those skilled in the art will also recognize that the measurement of the total number of pulses collected from both rotors during a test period can be substituted for the measurement of the frequencies of these rotors, with total volume passing through the meter being the measured quantity rather than flowrate of the meter. Additionally, the calculations of the accuracy of the meter can be made by substituting for the ratio of the K factors in equation (11) the ratio of the reference frequency divided by the measuring frequency. This substitution applies the principles of equation (4), above, which shows an inverse relationship between the frequency and the K factor measured at calibration. Both of these frequencies would be the values which were measured at the time of calibration for the line pressure and flowrate prevailing at the time the meter is being proved. Or those skilled in the art can generate best fit equations for the measuring and reference K factors as a function of the Reynolds Number of the pipe, that is the ratio of the inertial forces to the viscous forces of gas in the pipe.

Those skilled in the art will recognize that the signal processor 88 shown in FIG. 13 can be provided in a number of different formats. For example, it could be provided through hardwired electrical circuitry. By way of example only, a high resolution programmable 225 megahertz timer/counter with a regulated power supply, such as the Phillips PM6680, manufactured by John Fluke Manufacturing Company, Inc., P.O. Box 9090 Everett, Wash. 98206, could be used. The signal from the measuring rotor blades could be monitored on an oscilloscope. Additionally, the signal processor 88 can be provided through a dedicated electronic flow computer mounted on the gas turbine meter 20 and driven by its measuring rotor's mechanical output. For example it could be included on computers currently used by the gas industry, such as the Series AE 5000 sold by the American Meter Company of Erie, Pa., which use microprocessors to record, store and/or transmit gas data concerning gas flowing through gas meters used for gas distribution, gas pipeline transmission and gas production. The electronic circuitry or an appropriate computer could be arranged to periodically prove the accuracy of the gas turbine meter being monitored and transmit to the end user an indication of an undesirable change in the accuracy of the gas turbine meter when such a change has been determined. Alternatively, the measurement of the accuracy of the gas turbine meter according to this invention could be recorded or stored in computer storage media and later transmitted or otherwise obtained by the end user when desired.

It is contemplated that for many applications of this invention end users of gas turbine meters will buy a number of meters having two independently rotating rotors adapted to be connected to a signal processor designed according to this invention. However, only a single signal processor will be used to prove the accuracy of a plurality of meters and store the results for further use.

Figure 14:
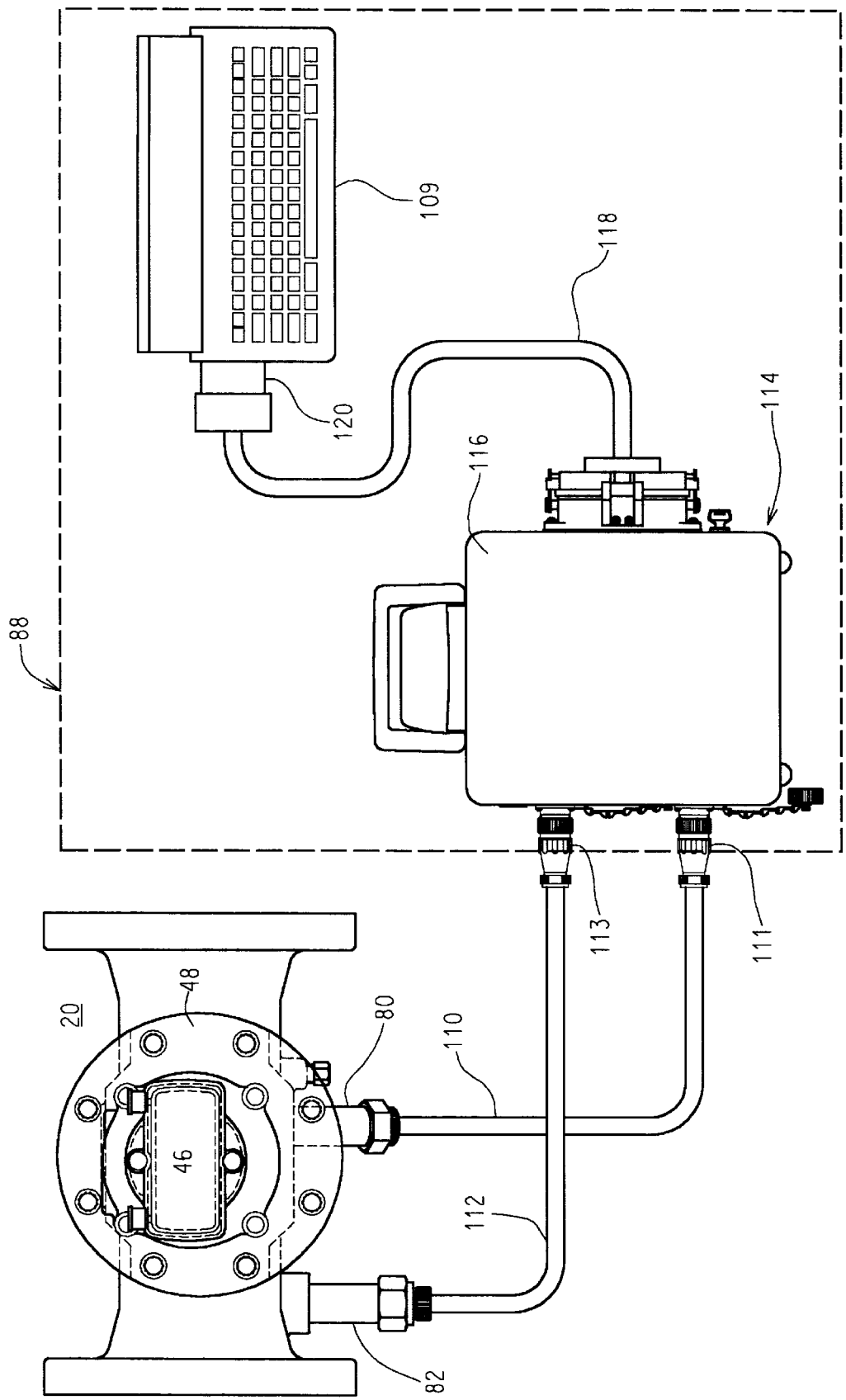
FIG. 14 depicts a preferred embodiment of this invention in which the signal processor includes a laptop proving kit and a laptop computer.

FIG. 14 shows a preferred embodiment of this invention in which the functions of the signal processor 88 are performed by a computer separate from the meter itself, such as a laptop computer 109. Any type of computer program desired may be programmed to operate in accordance with this invention using the programming language applicable to that program. In the preferred embodiment the laptop computer 109 uses a software program produced by the LABVIEW® program development system, sold by National Instrument Company of Austin, Tex. 78730-5039. The program is written in the graphical programming language G, and it includes the use of LABVIEW® driver software, as well as the well known PKUNZIP shareware program for inflating the software from diskettes into the laptop computer. The program as it was developed requires two 1.44 megabyte diskettes. A laptop computer 109 using the LABVIEW® software must have at least 16 megabytes of random access memory and a 486 hard drive. The computer must also have a Windows 3.1 or a Windows 95 operating system.

The proximity sensors in the housings 80 and 82 are coupled through fiberoptic cable 110 and connector 111 and through fiberoptic cable 112 and connector 113, respectively, to a laptop proving kit 114 having a weatherproof enclosure 116. The contents of the enclosure 114 are more fully described in FIGS. 15, 16 and 17. Its purpose is to amplify and shape signals from the proximity sensors so they can be used for the balance of the signal processor. It converts low voltage sine wave signals, generated when the turbine blades of the measuring rotor 38 and the reference rotor 62 pass the proximity sensors in housings 80 and 82, into square wave signals which can be processed by the laptop computer 109. Square wave signals from the laptop proving kit 114 are coupled through a shielded ribbon cable 118 and a data acquisition card 120 to the laptop computer 109. In the preferred embodiment the data acquisition card 120 was a DAQCard 700, sold by National Instruments Corporation of Austin, Tex. 78730-5039, which contains an 8253 computer chip used in conjunction with a laptop computer.

The laptop proving kit 114 and the computer 109 perform an accuracy check of the output of the measuring rotor 38 as determined by the register 46, or any other type of gas flow measuring mechanism used. Since the laptop proving kit 114 and the computer 109 are portable, they can be used in combination to check the accuracy, or prove, a number of gas turbine meters having a pair of independently rotating rotors. In the preferred embodiment, the cables 110 and 112 are at least about 20 feet long to insure that the laptop proving kit 114 and the computer 109 can be located outside what is considered a hazardous area, that is outside a 15 foot radius around the gas turbine meter 20. The cables 110 and 112 have quick connections to the meter 20 and to the laptop proving kit 114 which enable the cables to be rapidly connected and disconnected for the convenience of the user.

Figure 15:
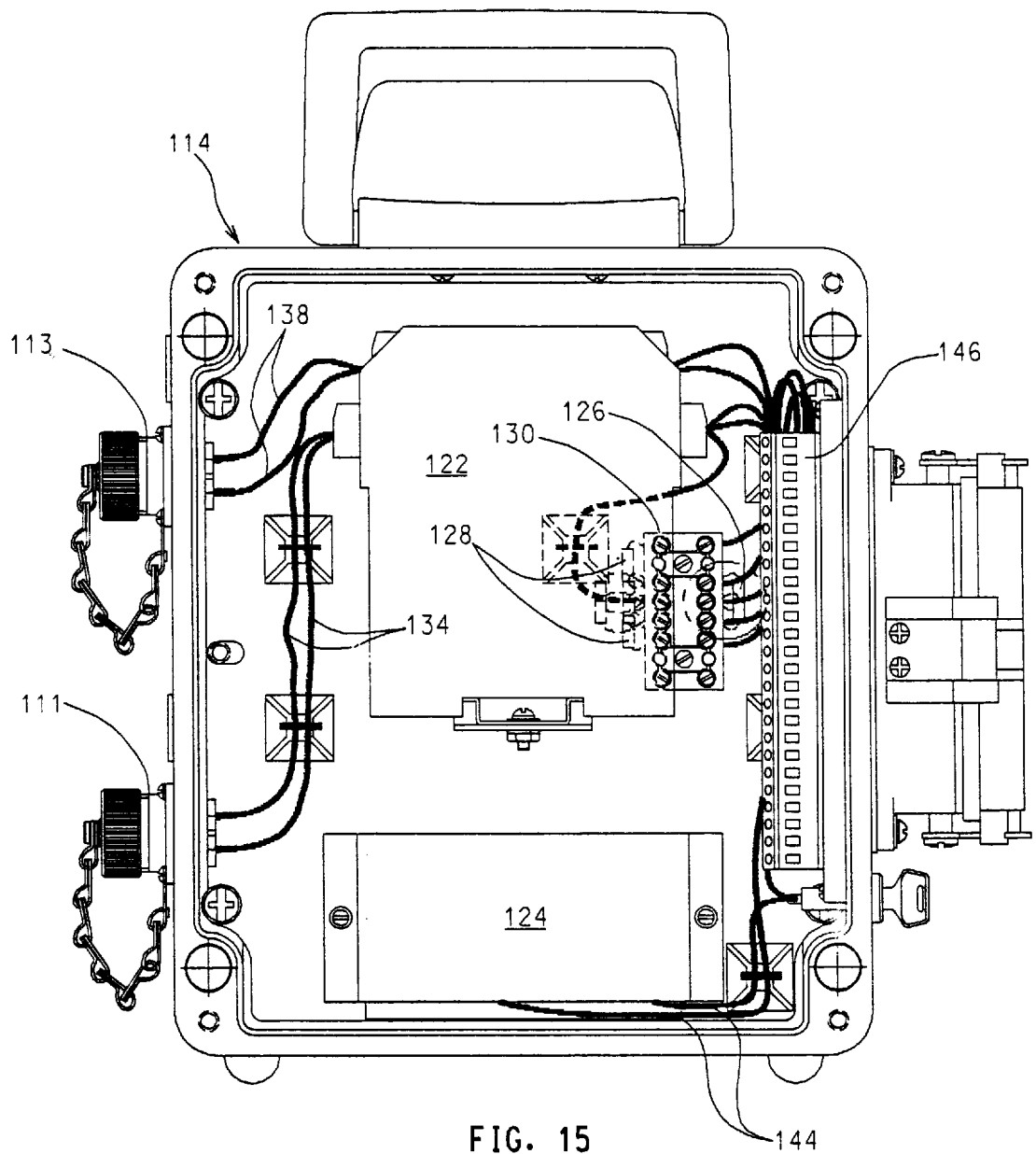
FIG. 15 shows the physical layout of a laptop proving kit.
Figure 16:
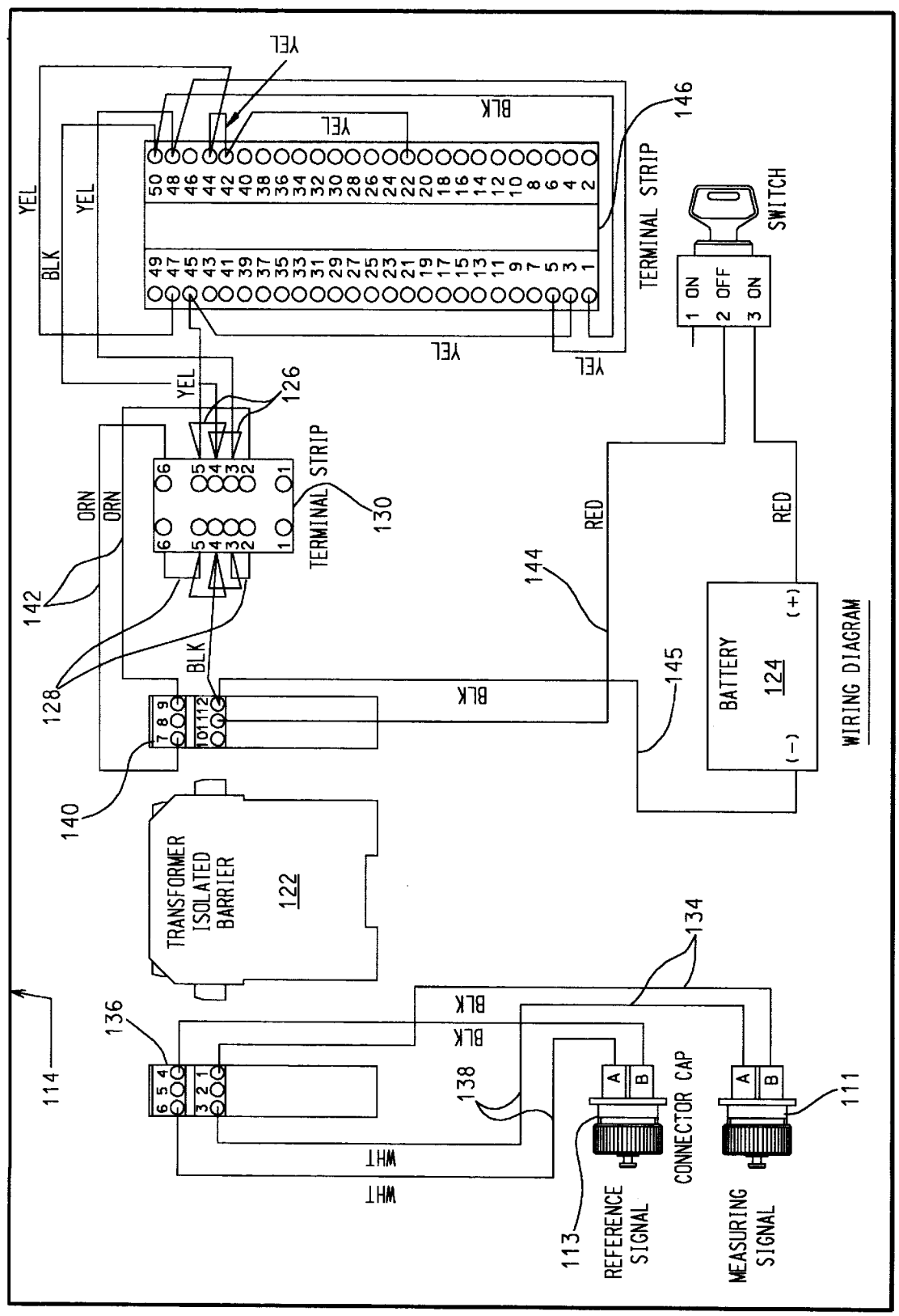
FIG. 16 is a wiring diagram of the laptop proving kit.
Figure 17:
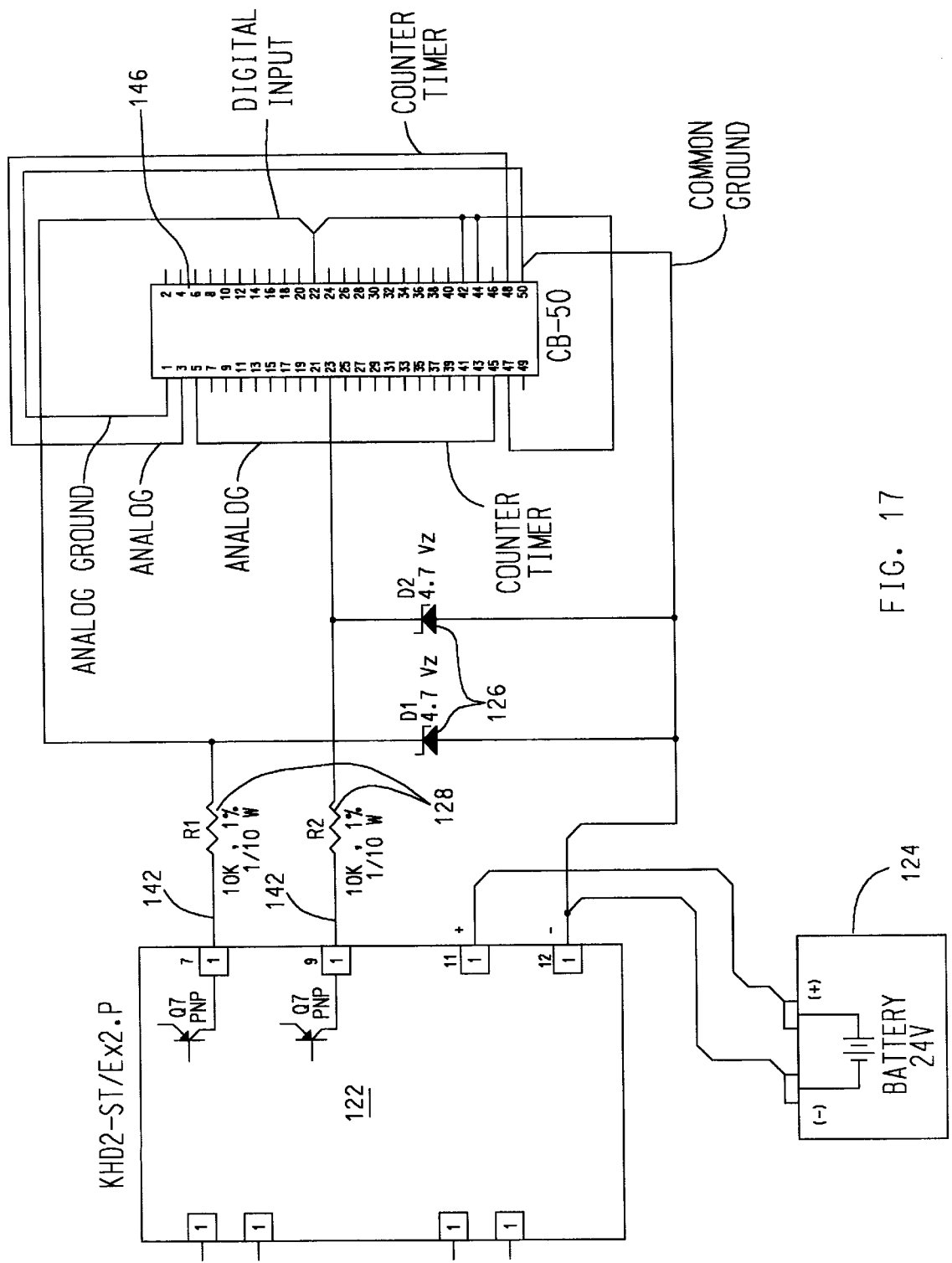
FIG. 17 is a schematic diagram of the laptop proving kit.

Referring to FIG. 15 and FIG. 16, the laptop proving kit 114 basically contains a transformer isolated barrier 122, a 24 volt battery 124, a pair of zenor diodes 126 and a pair of resistors 128. Terminal strips 130 and 132 are also provided to facilitate the wiring of an electrical circuit made up of the electrical components in the laptop proving kit 114 and coupling them through the cable 118 to data access card 120. The measuring signal from the cable 110, shown in FIG. 14, is coupled through a female portion of the connector 111 and wires 134 to two terminals of transformer terminal strip 136 connected to one side of the transformer isolated barrier 122. The reference signal from cable 112, also shown in FIG. 14, is similarly coupled through a female half of the connector 113 and through wires 138 and two separate terminals on transformer terminal strip 136.

Transformer terminal strip 140 is located on the other side of the transformer isolated barrier 122. The transformer isolated barrier 122 is dual channel, with one active transistor per channel, sold by Pepperl & Fuchs, located in Twinsburg, Ohio 44087-2202 as part number KFD2-ST-EX2. It receives low voltage sine wave reference signals and low voltage sine wave measuring signals from the proximity sensors mounted in the housings 80 and 82 as shown in FIG. 14. It amplifies the sine wave signals to 22 volts and converts the sine wave signals into rectangularly shaped pulse signals. The transformer isolated barrier also provides a safe barrier which eliminates the possibility of higher voltage electrical power from the battery 124 reaching the proximity sensors in the housings 80 and 82 on the gas turbine meter 20.

The sine wave measuring and reference output signals from terminal strip 140 are coupled through wires 142 to terminal 130 where they are each connected through one of the resistors 128 to one side of one of the zenor diodes 126. The resulting circuit is more clearly shown in the circuit diagram FIG. 17. In the preferred embodiment the battery 124 was a 24 volt Eveready Battery No. 763 having approximately 22.5 volts at its terminals under load. It is connected through wires 144 to a terminal of the transformer isolated barrier on transformer terminal strip 140, as shown in FIG. 16, and through wire 145 to a common ground. One side of each of the two zenor diodes 126 is also connected to the common ground. The zenor diodes 126 produce 5 volt square waves of the measuring signals and the reference signals which are coupled through terminal strip 146 to shielded ribbon cable 118 and to data acquisition card 120 shown in FIG. 14. The 5 volt signal insures that the data acquisition card 120 will not be damaged.

Figure 18:
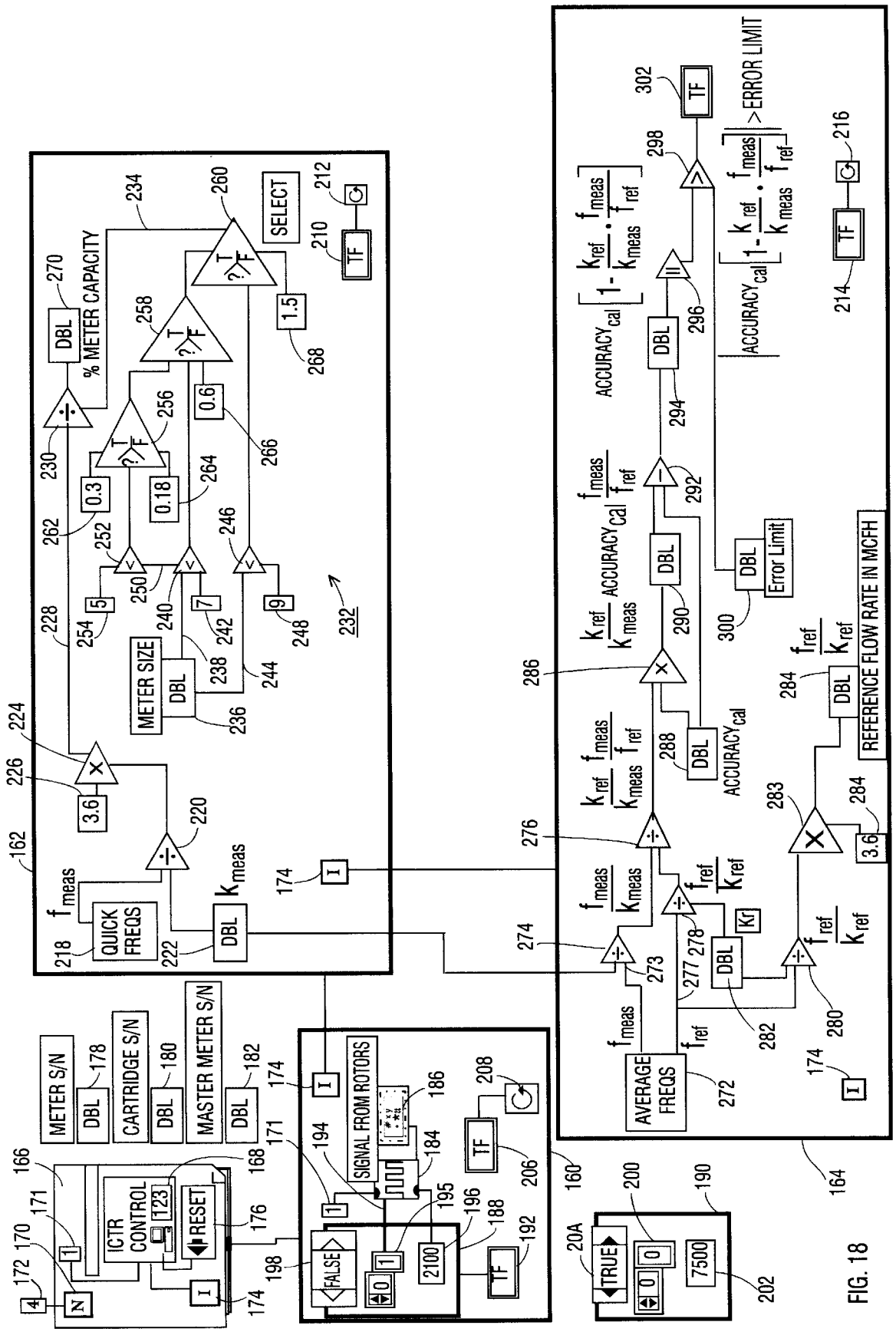
FIG. 18 is a diagram of the source code of a LABVIEW® program of the signal processor of this invention.
Figure 19:
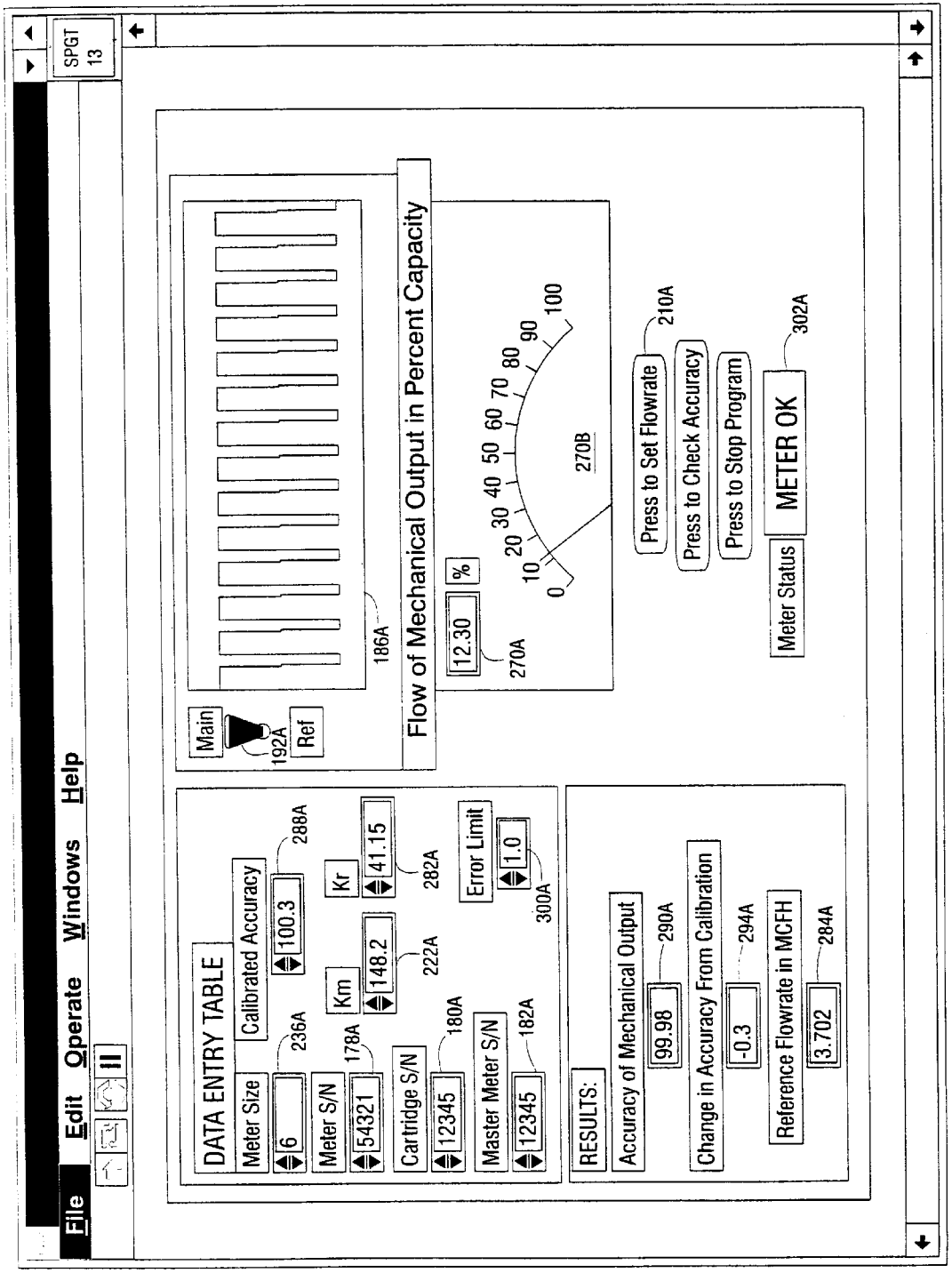
FIG. 19 shows a front panel of a LABVIEW® virtual instrument program of the signal processor.

In the preferred embodiment of this invention, shown in FIG. 18 and FIG. 19, two analog input channels, one digital input channel and three counter/timers of the data acquisition card 120 were used in the LABVIEW® program in analyzing the measuring and reference signals received from the gas turbine meter 20 and through the laptop proving kit 114. The analysis includes displaying the square wave analog signals generated either from the blades 40 of the measuring rotor 38 or the blades 64 of the reference rotor 62 (shown in FIG. 1) on a strip chart or computer terminal screen or other convenient display apparatus or media, as well as using frequency measurements of the measuring signal and the reference signal to determine the accuracy of the measuring rotor and flowrates of both rotors. The purpose of displaying these signals is so they can be inspected by an operator of the laptop computer 109 to determine, for example, whether the signals are uneven in spacing, or in their period, indicating that one or more of the rotor blades on a particular rotor may have been damaged, or whether the signals seem to be changing in spacing or in their periods on the display, which indicates rotor speed is unstable due to some condition such as pulsating flow or on-off flow in the gas line.

The LABVIEW® program development system uses the graphical programming language G to create programs in block diagram form as shown in FIG. 18. The source code of LABVIEW® programs relies on graphic symbols rather than textual language to describe programming actions. The LABVIEW® system has extensive libraries of icons representing functions and subroutines for most programming tasks. Additionally, LABVIEW® application engineers employed by National Instrument Company who are skilled in the art of developing LABVIEW® programs can be relied on to provide functions and subroutines which may not be available in LABVIEW® libraries on hand.

The LABVIEW® programs are called virtual instruments ("VI") because each of them includes a front panel, such as that shown in FIG. 19, which is associated with the elements of its block diagram source code, which is shown in FIG. 18. The operator of a LABVIEW® program sees and operates the front panel shown in FIG. 19 on a computer terminal screen and does not see, use or necessarily possess the graphics of the source code. Switches, buttons and dials shown on the front panel can be actuated in a manner similar to using an actual instrument, except they are actuated by using a computer mouse on a computer terminal screen. The data entry section in the upper left hand corner of the front panel can be entered by the operator through the use of a computer mouse and techniques described in instructions provided with the LABVIEW® program development system. As can be seen in FIG. 19, the data to be entered into the diagram includes meter size, serial numbers of the meter and the measuring cartridge and the reference cartridge, the last of which is referred to as a master meter. The operator must also enter a value of the accuracy of the mechanical index as it was calibrated at the test flow conditions, the K factors of the measuring rotor and the reference rotor at the test flow conditions and an error limit for the change in accuracy. If the difference between the calibrated accuracy and the accuracy measured in accordance with this invention is greater than the error limit, the meter status indication at the bottom right hand corner of FIG. 19 will indicate that the error has exceeded the allowed error limit.

Referring more specifically to FIG. 18, the LABVIEW® program is divided into three parts: a square wave tracing program 160, a measuring rotor flowrate program 162, and an accuracy measuring program 164. Each of these programs is enclosed in a dark rectangular frame and is called a While loop. A For loop 166, shown in the upper left-hand corner by an icon resembling a stack of papers, contains an ICTR Control 168 which insures the three While loops 160, 162 and 164 are operated in the proper sequence. The ICTR Control uses one of the counter/timers contained in the 8253 computer chip included in the data acquisition card 120 to time the sequencing of various functions within the While loops 160, 162 and 164 and is incorporated herein by reference. The small box 170 with the letter "N" within it is a portion of the For loop which receives a numeral, in this case the numeral 4 shown in the box 172, indicating there are four basic loops, including the For loop 166 and the While loops 160, 162 and 164, within the total program. The numeral 1 shown in box 171 is coupled to data acquisition card 120, with the numeral itself meaning there is only one data acquisition card being used. An iteration terminal 174 is included in the For loop 166 and in each of the While loops 160, 162 and 164 to count the number of times each loop has performed its particular function. A reset 176 can be used to set all functions at zero or default conditions. The LABVIEW® program has the ability to reset various values inputted to it to a set of default values selected by the user of the program. When the reset terminal 176 is actuated, all values in the data entry table go to the default values or to some new values which have been set to override the default values.

To the right of the For loop 166 is shown a set of three input terminals comprising meter serial number terminal 178, measuring cartridge serial number terminal 180 and master meter serial number terminal 182. These terminals enable the user to identify by serial number the gas turbine meter body which is being tested, the measuring cartridge which is being tested and the reference cartridge, which is being used as a master or standard upon which tests are being made. Referring to FIG. 19, these terminals are shown on the front panel of the LABVIEW® program as meter serial number control 178A, measuring cartridge serial number control 180A and master meter serial number control 182A.

The square wave While loop 160 include a square wave tracing subroutine 184 supplied by National Instruments Corporation application engineers to acquire square wave analog measuring signals or reference signals from the 8253 chip in the data acquisition card 120 shown in FIG. 14. This program 184, incorporated herein by reference, is called Acquire N Scans-SW Trig by National Instruments Corporation and is used for the purpose of displaying the analog signals on display terminal 186 after the signals are obtained. However, any program designed for this purpose by those skilled in the art is satisfactory.

The square wave While loop 160 also includes reference signal loop 188 and measuring signal loop 190, along with a toggle switch 192 which can assume either a "true" or a "false" condition. While the loops 188 and 190 are shown separately, both of these are coupled through connector 194 to a terminal of the square wave tracing subroutine 184. In the reference signal loop 188, the numeral 1 in box 195 indicates that channel "1" from the data acquisition card 120 is coupled through the reference signal loop 188 to provide reference signals for the square wave tracing subroutine 188. The numeral 2100 in box 196 represents a scaler that controls the scan rate. The "False" box 198 indicates that toggle switch 192 must be in its "false" mode to connect the reference signal through reference signal loop 188 to the square wave tracing program 184.

The measuring signal loop 190 includes a box 200 having the number "0" within it which indicates that it is connected to channel "0" of the data acquisition card 120 to receive the measuring signal. The numeral 7500 in box 202 represents a scaler that controls the scan rate of an external timer. The scan rate for the measuring signal loop 190 is higher than the scan rate for the reference signal loop 188 because in the preferred embodiment of this invention the measuring rotor rotates at a higher speed than the reference rotor. The "true" box 204 indicates that toggle switch 192 must be in its "true" modes to connect measuring signal loop 190 through connector 194 to the square wave tracing subroutine 184.

The ICTR control 168 is set by National Instruments Corporation application engineers so that 14 sequential pulses, representing each of the turbine blades of either the measuring rotor or the reference rotor will appear on the strip chart 168A, shown in FIG. 19, at any time, regardless of how fast the rotor being monitored is rotating. Toggle switch 192 corresponds to computer mouse-actuated switch 192A shown adjacent display chart 186A in FIG. 19. Thus, when switch 192A is actuated to its upward or "main" position, switch 192 in FIG. 18 is in its "true" position. Thus the measuring signals from the measuring rotor of the gas turbine meter being tested are coupled through the measuring signal loop 190 and the connector 194 to the square wave tracing program 184. It produces 14 pulses at the display terminal 186 and on the display chart 186A of FIG. 19, representing a signal generated by each blade of the measuring signal rotor. Similarly, if the switch 192A is actuated to its downward position, case structure 192 of FIG. 18 is in its "false" mode. This causes the reference signals to be coupled through reference signal loop 188 and connector 194 to the square wave tracing program 184. It then produces 14 pulses of the reference signal, representing each blade of the reference rotor, at display terminal 186 and thus on display chart 186A of FIG. 19.

Toggle switch 206 is connected to "run" icon 208, indicating that when toggle switch 206 is in the "true" mode square While loop 160 is operating, as long as neither of the corresponding "run" toggle switches in While loops 162 and 164 is in its "true" mode. When toggle switch 206 is in the "false" mode, which is the switch's default mode, the While loop 160 is not operating. Each of the corresponding "run" toggle switches in While loops 162 and 164 operates and controls its While loop in the same manner. Thus, toggle switch 210 is shown connected to run icon 212 to indicate that when toggle switch 210 is in its "true" mode, the flowrate While loop 162 is in operation. Toggle switch 210's default mode is "false," and it cannot be switched into the "true" mode to cause While loop 162 to operate unless toggle switch 206 in While loop 160 is in its "false" position and toggle switch 214, attached to run icon 216 in accuracy measuring While loop 164, is in its "false" position. Toggle switch 214 operates similarly.

In the course of the operation of the LABVIEW® program, the operator determines and then sets the flowrate of the measuring rotor, in percent capacity of that rotor, before determining the accuracy of that rotor. The purpose is to determine one or more flowrates with respect to which $Accuracy_{cal}$, $K_{meas}$ and $K_{ref}$ are to be entered into the program to enable the calculation of accuracy to take place. That is the purpose of flowrate While loop 162 shown in FIG. 18.

The flowrate While loop 162 includes a Quick Freqs VI subroutine 218 which is connected to the numerator side of divide function 220. Quick Freqs subroutine 218 was written by National Instruments Corporation application engineers specifically to measure the frequencies of two signals, the measuring signal and the reference signal, in conjunction with the 8253 computer chip used in the DAQCard 700 data acquisition card 120, is publicly available from National Instruments Corporation under the designation AMER MTR VI 4/96 and is incorporated herein by reference. This subroutine will not work for data acquisition cards that use other types of computer chips, such as the commonly used 9513 chip. Those skilled in the art can produce a frequency measuring program to meet the needs of any computer chip or other equipment used. The Quick Freqs subroutine is large and requires substantial processor time. It has been set to acquire pulses from both the measuring signal and the reference signal for five seconds and then calculate the frequency of both of these square wave signals, using all three counter/timers in the DAQCard 700. As will be more clearly described below, the Quick Freqs subroutine is also used in the accuracy measuring While loop 164.

The K factor of the measuring rotor, $K_{meas}$, is entered into the program through terminal 222 which is connected to the denominator side of divide function 220. Terminal 222 corresponds to Km control 222A shown in FIG. 19.

The quotient of divide function 220, $f_{meas}/k_{meas}$, is connected to one terminal of multiply function 224. As can be seen from equation (4), above, the divide function 220 produces the flowrate determined by the measuring rotor of the gas turbine meter being tested. However, in the preferred embodiment of this invention, it is desirable to express that flowrate in percent of capacity of the meter, measured in thousands of cubic feet of gas per hour. Thus, to produce a measurement of flowrate in thousands of cubic feet per hour, factor 226, having a value of 3.6, is connected to another terminal of multiply function 224. The resulting product is coupled through connector 228 to the numerator side of divide function 230.

The balance of flowrate While loop 160 is identified as meter size subroutine 232 and produces a numeral which is coupled through connector 234 to the denominator side of divide function 230 to convert the measurement of measuring rotor flowrate in thousands of cubic feet of gas per hour to the percent of capacity this represents of a particular meter. Subroutine 232 includes a meter size terminal 236 which is coupled through connector 238 to the upper side of comparator function 240. Factor 242, containing the numeral 7, is connected to the lower terminal of comparator function 240. Similarly, meter size terminal 236 is coupled through connector 244 to the upper terminal of comparator function 246. Factor 248, comprising the numeral 9, is coupled to the lower terminal of comparator function 246. Additionally, meter size terminal 236 is coupled through connector 250 to the lower terminal of comparator function 252. A factor 254, containing the numeral 5, is connected to the upper terminal of comparator function 252.

The comparator functions 240, 246 and 252 operate in such a manner that if the numeral at their upper terminal is less than the numeral at their lower terminal, the output will be a "T", indicating that the condition is true. If, however, the numeral at its upper terminal is greater than the numeral at its lower terminal, the output will be an "F", indicating that the condition is false.

Meter size subroutine 232 further includes three select functions 256, 258 and 260. Each select function has an input terminal shown as a "?," along with an upper output terminal marked with a "T," to indicate that the numeric value coupled to that area of the select function will become the output if there is a "true" condition at its input terminal. Each select function also includes a lower "F" terminal which causes numeric value at this terminal to become the output of the select function if the condition of the input terminal of the select function is "false."

The output of comparator function 252 is coupled, or "wired" using LABVIEW® systems terminology, to the input terminal of select function 256. Factor 262, comprising the numeral 0.3, is wired to the "T" terminal of selector 256, while factor 264, comprising the numeral 0.18, is wired to its "F" terminal and the output of comparator 240 is wired to the input terminal of select function 258, and similarly, the output of select function 256 is wired to the "T" terminal of select function 258, whereas factor 266, comprising the numeral 0.6, is wired to its "F" terminal. Additionally, the output of comparator 246 is wired to the input terminal of select function 260, with the output from selector 258 wired to the "T" terminal of selector 260 and factor 268, comprising the numeral 1.5, wired to its "F" terminal. The output of selector 260 is wired through connector 234 to the denominator of divide function 230. The quotient of divide function 230 is wired to percent meter capacity terminal 270.

Referring to FIG. 19, along with FIG. 18, "Press to Set Flowrate" button 210A corresponds to toggle switch 210 and is actuated by a computer mouse to its "true" mode to turn on flowrate While loop 162 after the appropriate data has been entered into the Data Entry Table. Meter size input terminal 236A in the upper left-hand corner of the front panel corresponds to the meter size terminal 236 in flowrate While loop 162. The operator enters the size of the gas turbine meter being tested into meter size input terminal 236A prior to the time when testing is to begin. Referring again to the front panel in FIG. 19, % meter capacity indicator 270A corresponds to percent meter capacity terminal 270 and provides a numerical indication of the percent of maximum meter capacity which was measured going through the measuring rotor of the gas turbine meter being tested. That percent of maximum meter capacity is also shown on percent meter capacity dial 270B.

Prior to the operation of the flowrate While loop 162, the operator must also enter the value of the $K_{meas}$ for the flowrate at which the meter testing is to take place. The actual flowrate of the gas turbine meter being tested must be adjusted to reach a desired test flowrate of the gas turbine meter as shown on indicator 270A and dial 270B.

The toggle switch 210 is actuated to begin the operation of flowrate While loop 162 and will do so as long as toggle switches 206, in square wave While loop 160, and toggle switch 214 in accuracy measuring While loop 164 are in a "false" condition. The Quick Freqs subroutine 218 determines the frequency of the measuring signal which is coupled through comparator 220 to provide the flowrate of the gas turbine meter being tested. This flowrate is multiplied by the factor 3.6 by multiply function 224 which is wired through connector 228 to the numerator of divide function 230.

Assume a six inch meter is being tested. The numeral six is entered in the meter size input terminal 236A of FIG. 19 and is wired through meter size terminal 236 of flowrate While loop 162 in FIG. 18 to the upper terminal of comparator 240 and the lower terminal of comparator 252. Since the numeral five from factor 254 is less than six, the output from comparator 252 is "true," causing 0.3 from factor 262 to be sent or transmitted through the "T" terminal of selector 256 to the "T" terminal of selector 258. Referring now to comparator 240, since six received from meter size terminal 236 is less than seven received from factor 242, the output of comparator 240 is "true," causing selector 258 to have an output from its "T" function of 0.3 which it received from selector 256. Additionally, the numeral six received by comparator 246 from meter size terminal 236 is less than nine received from factor 248, causing the output of comparator 246 to be "true." Since the condition at the input of select function 260 is "true," the numeral 0.3 received at its "T" terminal becomes its output and is sent through connector 234 to the numerator of divide function 230. When the flowrate of the measuring rotor, measured in thousands of cubic feet per hour, is divided by 0.3, the flowrate of the measuring rotor is expressed in the percent of the capacity of that rotor.

Referring to FIG. 13, along with FIG. 18, the function of frequency measurer 103 is provided by Quick Freqs subroutine 218, while the function of scaler 104 is provided by a combination of $K_{meas}$ terminal 222 and comparator 220. The balance of flowrate While loop 162 converts the measured flowrate into the scale of measurement desired, that is thousands of cubit feet per hour in the preferred embodiment, and enters the type of measurement which is to be indicated, that is percent of the maximum capacity of the meter being tested in the preferred embodiment.

Figure 20:
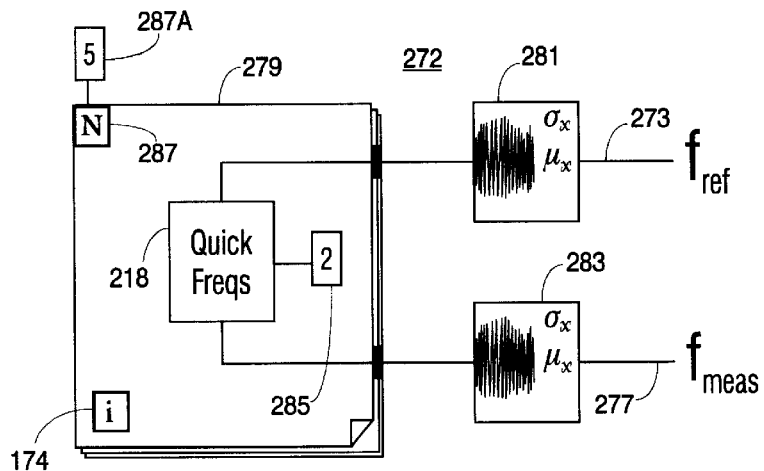
FIG. 20 is a diagram of the source code of the Average Freqs subroutine shown in FIG. 18.

The accuracy measuring While loop 164 determines the accuracy of the gas turbine meter being tested and provides an indication of that accuracy to the operator of the program, provides an indication of a deviation from the initially calibrated accuracy of the gas turbine meter being tested, provides an indication of a malfunction of the gas turbine meter being tested based on a preselected error limit, and measures the flowrate of gas passing through the reference rotor. The frequency of both the measuring signal and the reference signal are measured through the use of average frequency function 272. This function is provided by the Quick Freqs subroutine 218 plus averaging programs as shown in FIG. 20. In the average frequency function 272 the Quick Freqs subroutine 218 measures the frequency of both the measuring signal and the reference signal. The average frequency function 272 comprises a For loop 279 and a pair of standard deviation functions 281 and 283 provided by the LABVIEW® system and indicated by the icons shown in FIG. 20. A standard deviation function can perform a mathematical calculation of the standard deviation of a series of inputs, such as a series of frequency measurements from the measuring rotor or the reference rotor of a gas turbine meter provided in accordance with this invention. The results of this calculation are coupled from a terminal of the standard deviation function represented by the Greek letter sigma. Additionally, the standard deviation function program can produce a calculation of the mean value or average value of a series of frequency measurements. That calculation is indicated by an output from a terminal marked with the Greek letter mu. In FIG. 20, the wires 273 and 277 are connected to the average frequency terminals of the standard deviation functions 281 and 283, respectively.

With reference to the For loop 279, the Quick Freqs subroutine 218 is shown wired to a box 285 which represents the input of the measuring signals and the reference signals from the For loop 166 shown in FIG. 18. The iteration terminal 174 performs the same function that it did in each of the For and While loops shown in FIG. 18, which is a determination of the number of times the loop performs its particular function. The N box 287 is connected to a box 287A having a numeral "5" in it, indicating that five separate samples of both the measuring signals and the reference signals will be fed through the Quick Freqs subroutine 218 and to the standard deviation functions 281 and 283 to complete an operation of the average freqs function 272.

Thus, in operation the Quick Freqs subroutine 218 measures pulses of both the measuring signal and the reference signal for five second intervals. The frequency measurement of each of five successive samples of these signals is fed to its appropriate standard deviation function, which is 281 for the reference signals and 283 for the measuring signals. The running average of these five measurements of the reference signal is received at wire 273 at the mu terminal of the reference standard deviation function 281. Similarly, the running average of the five measurements of the frequency of the measuring signals is received at wire 277 attached to the mu terminal of the measuring standard deviation function 283.

Referring now to FIG. 18, the frequency measurement of the measuring signal is sent through wire 273 to the numerator of divide function 274, with $K_{meas}$ sent from $K_{meas}$ terminal 222 to the denominator terminal of divide function 274. The quotient of the inputs to divide function 274, the flowrate $f_{meas}/K_{meas}$, is sent to a numerator terminal of divide function 276.

The measurement of the frequency of the reference signal $f_{ref}$, is coupled from average frequency function 272 through wire 277 to the numerator terminal of divide function 278. It is also coupled to the numerator terminal of divide function 280. $K_{ref}$ terminal 282 supplies the value of the K factor of reference rotor at the flow conditions of the test to both the denominator of divide function 278 and the denominator of divide function 280. The quotient of the divide function 280, $f_{ref}/k_{ref}$, is coupled to one input of multiplier 283, and factor 284, having a value of 3.6 is coupled to its other input terminal. The product of the reference flowrate and 3.6 provides a measurement of the flowrate through the reference rotor in thousands of cubic feet per hour at reference flowrate terminal 284. This measurement of the flowrate is likely to be more accurate than that provided by flowrate While loop 162 as a percent of the maximum capacity of the meter. The reasons are two fold. First of all, as explained above, the reference rotor is constructed in such a manner that it is less likely to be affected by increases in friction, damaged components and other factors which change the accuracy of rotors on gas turbine meters. Additionally, by averaging four consecutive measurements of the frequency of the reference signal, the average frequency function 272 ensures a more accurate measurement of the flowrate.

To aid in determining the accuracy of the gas turbine meter being measured, the quotient of divide function 278 is coupled to the denominator terminal of divide function 276, which then divides the measurement of the flowrate of the measuring rotor by the measurement of the flowrate of the reference rotor and couples this quotient to one terminal of multiply function 286. Calibrated accuracy terminal 288 receives the numerical value of the $Accuracy_{cal}$ from the operator or from an appropriate data bank, and this numeral then is coupled to a second terminal of multiply function 286. As a result, the output of multiply function 286 is the measurement of the accuracy of the mechanical output, or the index, of the gas turbine meter being tested as shown above in equation (11). This measurement of accuracy is displayed on measured accuracy terminal 290.

The change in accuracy from when the gas turbine being tested was calibrated is determined by subtract function 292 which receives the measurement of the accuracy from terminal 290 and receives $Accuracy_{cal}$ from terminal 288. The difference between the accuracy of calibration and the measured accuracy is received from subtraction function 292 by terminal 294. That difference is coupled to absolute value function 296 which provides the absolute value of that difference to one terminal of comparator 298. A desired error limit is provided through error limit terminal 300 to the other terminal of comparator 298. If the absolute value of the error in the accuracy is greater than the desired error limit, comparator 298 assumes a "T" or true condition at terminal 302. If is not, that terminal assumes a "F" or "false" condition at terminal 302 indicating that the accuracy test showed that the gas turbine meter being tested was still satisfactory.

Referring once again to FIG. 19 along with FIG. 18, an operator of the Visual Instrument shown in FIG. 19 must enter the value of reference rotor K factor for the test conditions at input control 282A, which corresponds to $K_{ref}$ terminal 282, and must enter the value of the calibrated accuracy of the measuring rotor for the test conditions at control 288A, which corresponds to terminal 288. The desired error limit is entered at control 300A, corresponding to terminal 300 in FIG. 18.

The results of the operation of accuracy measuring While loop 164 are displayed in the bottom left hand corner of the front panel shown in FIG. 19, and at the bottom of the right hand portion of that panel. The measurement of the accuracy of the meter is shown on indicator 290A which corresponds to accuracy measuring terminal 290. Additionally, the change in accuracy is displayed on indicator 294A, corresponding to terminal 294, and the flowrate measured by the reference rotor is displayed on indicator 284A, corresponding to reference flowrate terminal 284. The status of the meter vis-a-vis the desired error limit is displayed on indicator 302A which corresponds to terminal 302 of accuracy measuring While loop 164.

All of the data on the data entry table of the Front Panel shown in FIG. 19 can be recorded by the computer, as well as the percent of capacity at which the accuracy of the meter was determined, the results of the determination and the status of the meter. This information can then be transferred to another data base or included in a report.

Figure 21:
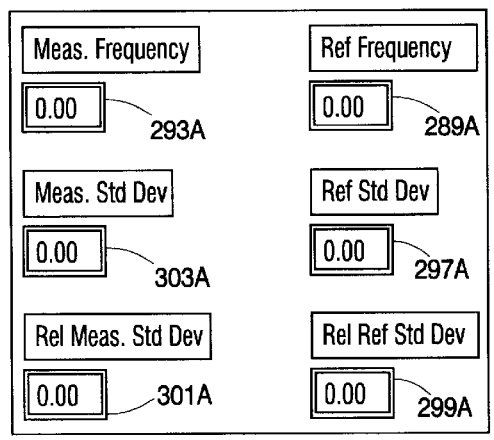
FIG. 21 shows a front panel of a LABVIEW® virtual instrument program shown in FIG. 22.
Figure 22:
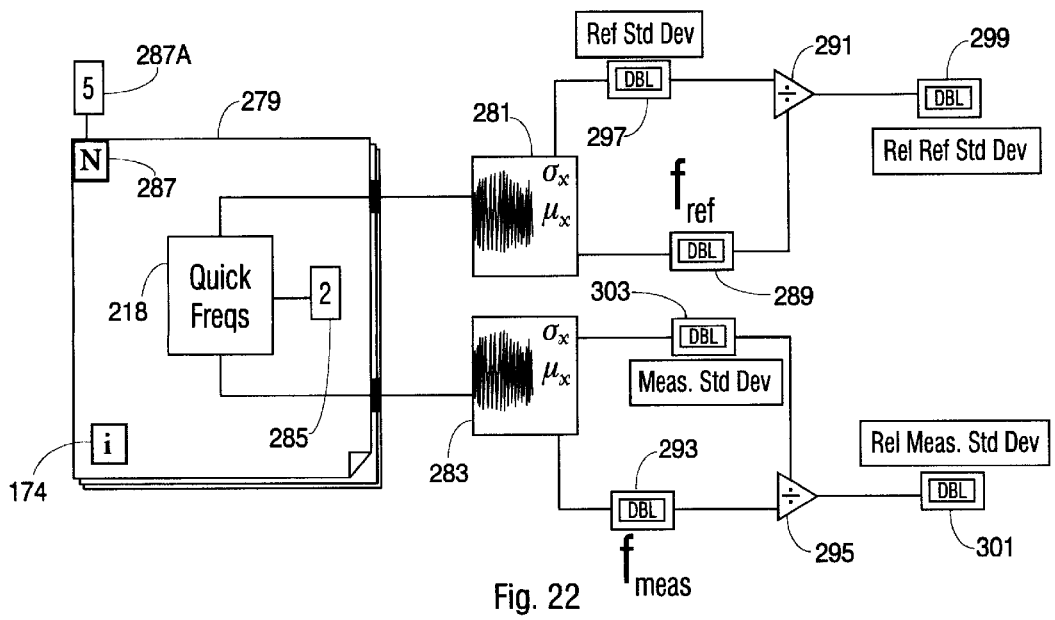
FIG. 22 shows the source code of a LABVIEW® program used to check test results during the calibration of a gas turbine meter manufactured in accordance with this invention.

FIGS. 21 and 22 show a Virtual Instrument which is used during calibration when determining K factors of the measuring rotor and the reference rotor of a gas turbine meter having two independently rotating rotors within it. According to equation (4), above, the flowrate Q equals the frequency measured for the conditions at the particular point of calibration, divided by the K factor measured at that time for those conditions. Those skilled in the art will recognize that the K factors can be determined by measuring the frequency at the time of calibration and providing an accurately measured flowrate of gas using any of a number of well known instruments such as a bell prover, a sonic nozzle prover or a similar device known for its accuracy. The Virtual Instrument shown in FIGS. 21 and 22 measures the reference frequency and the measuring frequency and determines the relative standard deviation of each of these as an indication of the certainty or uncertainty of the data being measured.

The For loop 279 and the standard deviation functions 281 and 283 are identical to those program items described with respect to FIG. 20. As indicated above, the For loop 279 uses the Quick Freqs function 218 to measure frequency over a five second duration. The For loop 279 provides this measurement of frequency of the reference signal to the input terminal of the standard deviation function 281 and provides this measurement of the frequency to the input terminal of the standard deviation function 283. The standard deviation functions 281 and 283 each accumulate five successive frequency measurements from the Quick Freqs function 218. The mean or running average value of the five measurements of the frequency of the reference signal is transferred from the mu terminal of standard deviation function 281 to a reference frequency terminal 289 and then to the denominator of divide function 291. Similarly, the mean or average of the five frequency measurements of the measuring signal is transferred from the mu terminal of the standard deviation function 283 to terminal 293 and then to the denominator of divide function 295.

In accordance with one aspect of this invention, the standard deviation of the five samples of the frequency of the reference signal is calculated by the standard deviation function 281. That is, the standard deviation function calculates the square root of the average of the squares of deviations of the five measurements of the reference signal from the mean value of the five measurements. This calculation is wired through reference standard deviation terminal 297 and to the numerator of divide function 291 where it is divided by the mean or average value of the frequency measurements of the reference signal. The quotient of the divide function 291 provides the relative standard deviation of the five measurements of the reference signal at terminal 299. It is this value which determines whether the five measurements of the reference signal are sufficiently close together so as to be reliable measurements of the reference signal from a statistical standpoint. If they are sufficiently close together the mean or average value calculated for the frequency should be used, along with the flowrate used for this step of calibration, to determine the K factor using equation (4). If the relative standard deviation of the five measurements of frequency indicates that signals are not sufficiently close together, a new measurement of frequency must be used. Based on tests conducted, if the relative standard deviation is greater than approximately 0.2% this measurement of the frequency should not be used in calculating the K factor for the operating conditions at this point of the calibration.

Similarly, the quotient of the divide function 295 provides the relative standard deviation of the frequency of the five samples of the measuring signal to terminal 301. This calculation enables an operator to determine whether these signals are so disbursed that this measurement is not reliable.

Referring to FIG. 21, the front panel shown has a reference frequency indicator 289A which displays the average value of the reference frequency from terminal 289 in FIG. 20, a reference signal standard deviation indicator 297A which displays the measurement of the standard deviation of reference signal from terminal 297 and a relative reference standard deviation 299A which displays the relative standard deviation of the reference signal measured which is present at terminal 299. The front panel also includes a measuring frequency indicator 293A which corresponds to terminal 293 in FIG. 20, a measuring signal standard deviation indicator 303A which corresponds to terminal 303, and a relative standard deviation indicator 301A for the five measurements of the measuring signal, corresponding to terminal 301. Those skilled in the art will recognize that the front panel shown in FIG. 21 can be used in the course of calibrating a gas turbine meter to determine if the measurement of frequency used to calculate the K factors of a meter during calibration of the meter are reliable.

Rotor Bearing Protection

Figure 23:
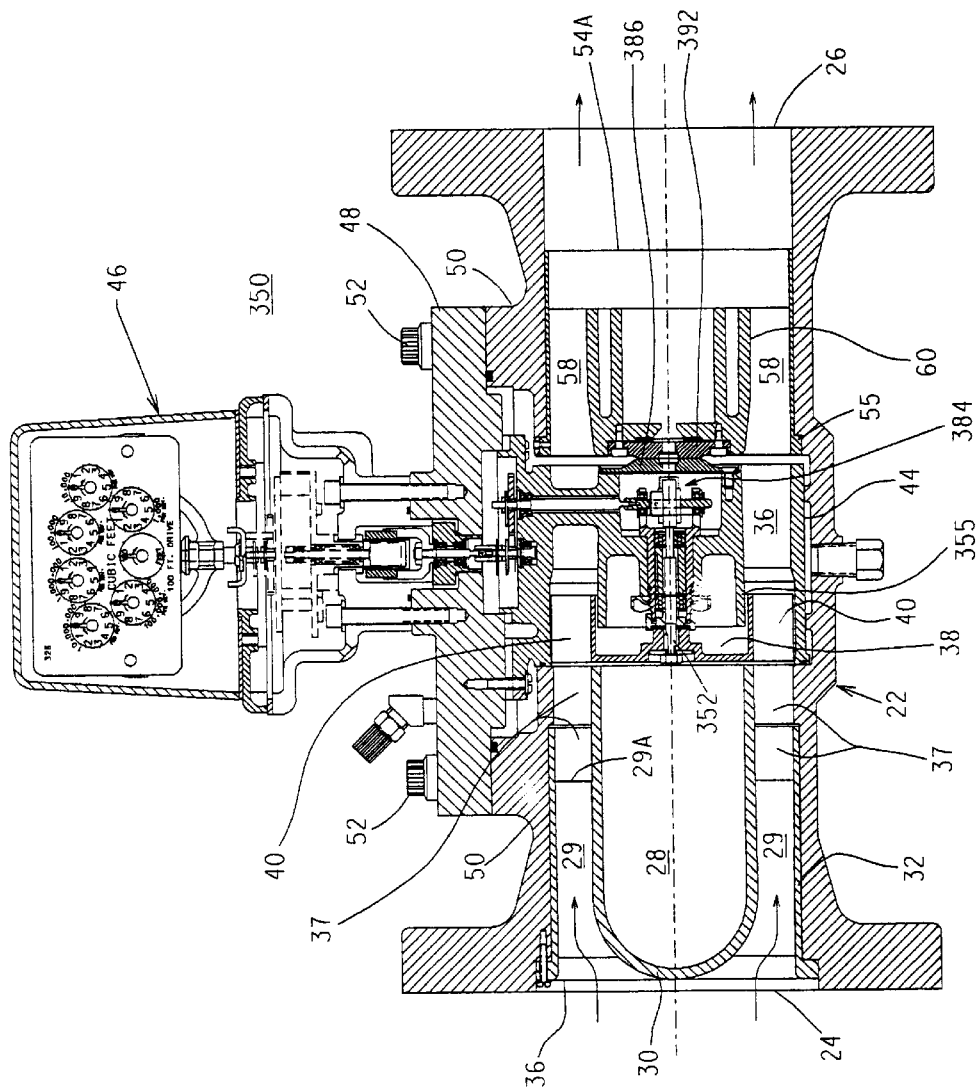
FIG. 23 is a sectional side view of a gas turbine meter incorporating features of another aspect of this invention.

FIG. 23 shows a gas turbine meter 350 constructed in accordance with certain aspects of this invention that do not necessarily require the utilization of the reference rotor. Those components of the gas turbine meter 350 which are identical to previously described components of the gas turbine meter 20, and shown in the previous drawings such as FIGS. 1–9, and referred to above in the specifications, are identified with the same numerals.

Referring specifically to FIG. 2, along with FIG. 23, the turbine meters 20 and 350 include a housing 22 in which there is mounted the flow straightening assembly 28 and the measuring cartridge 36, the top plate 48 and the register 46, along with the housing 54A of the reference cartridge 54. While the reference rotor and its associated rotor shaft, bearings and bearing holder are not included in the gas turbine meter 350, the use of the reference cartridge housing 54A enables the measuring cartridge 36 to be firmly installed in the meter housing 44. Additionally, the use of the reference cartridge housing 54A allows a user of the gas turbine meter 350 to substitute a complete reference cartridge 54, including the reference rotor 62, for the housing 54A if the user wishes to take advantage of the self-proving aspects of this invention.

It is apparent from FIG. 2 that the measuring cartridge 36 is installed through the flange 50 into a central pocket 22A of the meter housing 22. The reference cartridge 54, including the reference cartridge housing 54A, is also installed in the meter housing 22 through the flange 50. This installation takes place before the measuring cartridge 36 is installed in the housing 22. Thus, flange 55 on the upstream end of reference cartridge 54 contacts the downstream end of the pocket 22A of the meter housing 22 to hold the reference cartridge 54 in place. The preferred embodiment of this invention is described with respect to a gas turbine meter in which the components such as the measuring cartridge 36 and the reference cartridge 54 and/or reference cartridge housing 54A are installed through the center of the housing 22. Those skilled in the art will recognize that the structures shown can be adopted within the scope of this invention to meters which have their components installed through one end of the meter.

Figure 7:
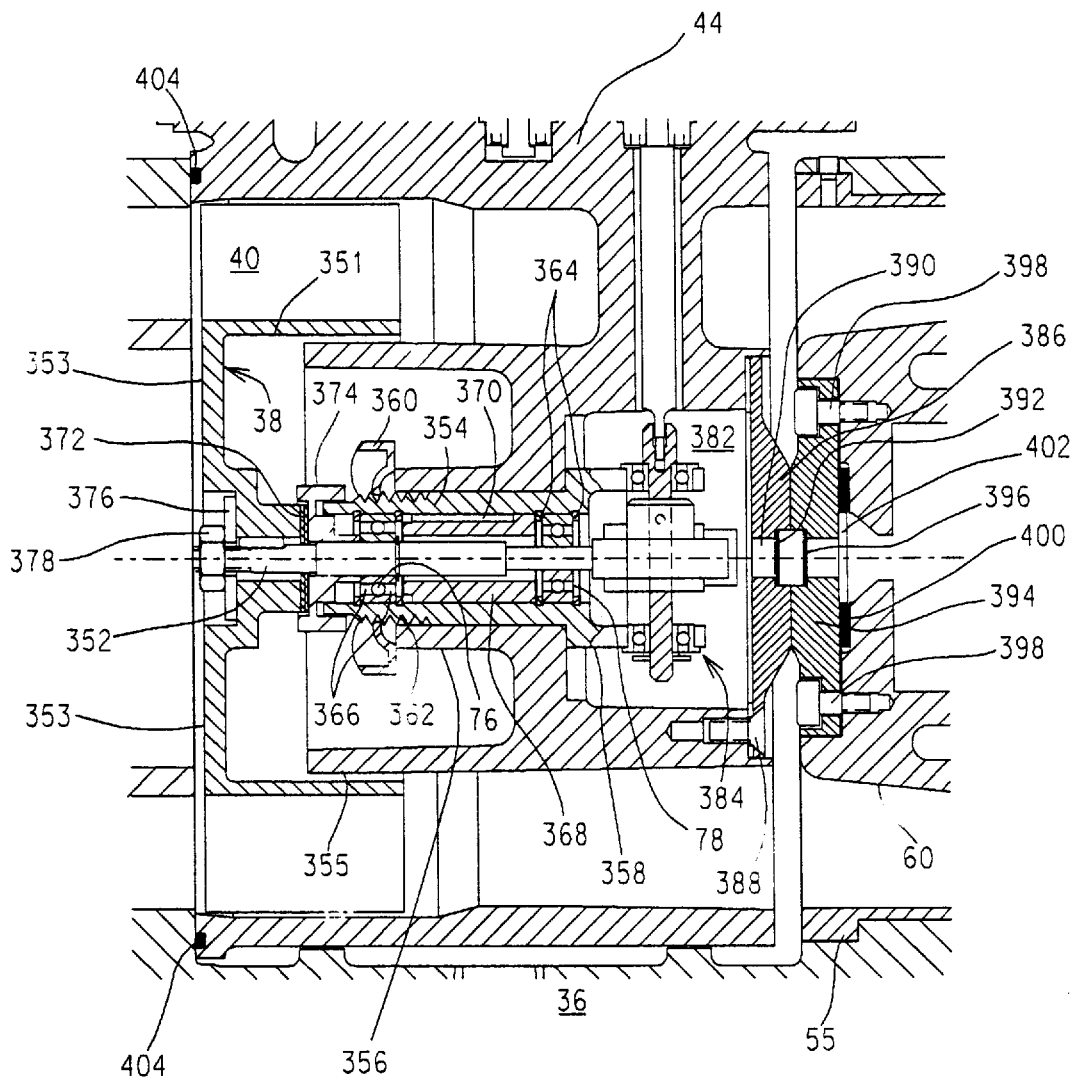
FIG. 7 is a partial, sectional side view of a measuring cartridge.

Referring now to FIG. 7, along with FIG. 23, the measuring rotor 38 is mounted on a rotor shaft 352 which is coupled through upstream measuring rotor bearings 76 and downstream measuring rotor bearings 78 and bearing holder 354 to an internal bearing hub 356 in which the bearing holder 354 is mounted.

The rotor 38 includes a rotor hub 351 on which turbine blades 40 are mounted and a front face 353, circular in shape, which supports the rotor hub 351.

In accordance with one aspect of this invention, the front face 353 is solid across its surface, that is without any holes in its surface except for the hole through its center which enables the rotor 38 to be mounted on the rotor shaft 352. This solid surface of the front face 353 prevents gas flowing through the gas turbine meter, including any contaminants which may be present in the gas, from flowing directly through the rotor toward rotor bearings 76 and 78.

Additionally, the measuring cartridge 44 includes a cylinder 355 forming a cylindrical chamber which is concentric with the rotor 38 and has an outside diameter which is slightly less than the inside diameter of the rotor hub 351. The upstream end of the cylinder 355 is of such a length that it extends beneath at least a portion of the rotor hub 351. The portion of the cylinder 355 downstream of the rotor 38 is continuous and smooth so contamination cannot accumulate near the rotor hub 351 where it could be pulled between the rotating hub 351 and the cylinder 355. The solid surface of the front face 353, the overlapping of the rotor hub 351 with the cylinder 355 and the smooth and continuous surface of cylinder 355 downstream of the rotor hub 351 create a condition which would require contamination to flow upstream between the rotor hub 351 and the cylinder 355 to reach the cylindrical chamber where the bearing holder 354 and the measuring rotor bearings 76 and 78 are mounted. Additionally, the exterior surface of the cylinder 355 has a slight, downstream conical slope toward the axis of the cylinder. This slope assists in causing contamination in the gas flowing through the meter to flow away from the clearance between the rotor hub 351 and the cylinder 355.

The bearing holder 354 is inserted into the internal hub 356 from the downstream end of the measuring cartridge 44. A flange 358 at the downstream end of the internal hub 356 contacts the downstream end of the internal hub 356. The bearing holder 354 is held in place against the internal hub 356 through the use of hexnut 360 which is tightened against the upstream end of the internal hub 356 as the hexnut 360 is rotated on screwthread 362 on the outside surface of the bearing holder 354.

The rotor bearings 78 are held in place by a pair of retaining rings 364, while the rotor bearings 76 are held in place by a similar pair of retaining rings 366. The ball bearings 76 and 78 are separated by an oiling pad 368. This oiling pad 368 has slot 370 in it which must line up with holes (not shown) in the measuring cartridge housing to allow oil to properly get to the oiling pad 368. The slot 370 must also be lined up with holes in the retaining rings 364 and 366 (not shown) which are adjacent the oiling pad to enable oil to properly lubricate the rotor bearings 76 and 78. This type of structure is well known to those skilled in the art of designing and manufacturing gas turbine meters.

The measuring rotor 38 is coupled to the rotor shaft 352 through a set of shims 372 and a bearing shield 374. The purpose of the shims 372 will be explained more fully below. The bearing shield 374 is centered on the rotor shaft 352 and fits about the upstream end of the bearing holder 354 to aid in protecting the rotor bearings 76 and 78 from contamination. Once the rotor 38 is set in place against the shims 372, a flat washer 376 is placed against the upstream end of the rotor 38 and a hexnut 378 is turned onto screwthreads at the upstream end of the rotor shaft 352. The hexnut 378 is tightened to the extent desirable to hold the rotor 38 in place.

The measuring cartridge 365 further includes a coupling chamber 382 in which is mounted a coupling 384 connected between rotor shaft 352 and register 46, the latter of which is shown in FIG. 23. The coupling 384 can comprise any series of gears, shafts and bearings and/or they include magnetic coupling components of the type used by those skilled in the art to interconnect measuring shaft rotors of gas turbine meters to mechanical registers.

The coupling chamber 382 is closed by a cover plate 386 which is attached to its downstream end by a series of bolts around its circumference, one of which is shown as both 388. The cover plate 386 has an orifice 390 at its center which has a breathing cartridge 392 installed in it. The purpose of the orifice is to dissipate heat and pressure built up within the coupling chamber 382 while the gears and bearings rotate when the gas turbine meter is in operation. This prevents the possibility of sucking gas and possible contamination through the clearance between rotor hub 357 and cylinder 355. The breathing cartridge may be made of any appropriate structure such as a fine mesh screen or a fiber membrane which allows heat and pressure to escape from the coupling chamber 382, while preventing contaminants from entering the coupling chamber 382 to adversely affect the coupling 384 or the rotor bearings 78 or 76.

Similarly, a cover plate 394, having a central orifice and a breathing cartridge 396 which is identical to the breathing cartridge 392, is fastened to reference cartridge hub 60 by a series of bolts 398. The cover plates 386 and 394 develop a level of spring tension and act as spring plates as they are installed. Additionally, a spring mechanism 400, comprising a Bellvile washer in the preferred embodiment, is provided to exert pressure against the measuring chamber 22. The Bellvile washer 40 is mounted between cover plate 394 and a cut out area 402 of the upstream end of the reference hub 60. The Bellvile washer 400 exerts a pressure against cover plate 394 which is coupled through cover plate 386 to the cartridge housing 44. Those skilled in the art will recognize that other types of spring mechanisms can be used to exert pressure on the cartridge housing 44, some of which may operate through cover plate 394 and some of which may not.

The cartridge housing 44 has a sealing mechanism 404 installed about the outside of its upstream end to prevent gas from bypassing the normal gas passageway of the measuring chamber 36. In the preferred embodiment, this sealing mechanism 404 is an O-ring, although any other type of sealer could be substituted for the O-ring. The pressure exerted by the Bellvile washer and through the cover plates 394 and 386 and the structure of the cartridge housing 44 exerts force upon the O-ring 404 to assist it in forming a positive seal against the housing of the gas turbine meter 350.

Meter Accuracy Adjustment

As explained above, gas turbine meters are calibrated by testing them for their accuracy at different gas line pressures at which they are expected to operate. At each gas line pressure gas turbine meters are tested for accuracy at the various flow rates which are expected to occur during their operation. Referring to FIG. 23, the calibration of a gas turbine meter such as the meter 350 often includes adjusting the ratios of gears within coupling 384 so that the register 46 is 100% accurate at a flow rate of about 60% of the maximum capacity of the meter.

Figure 26:
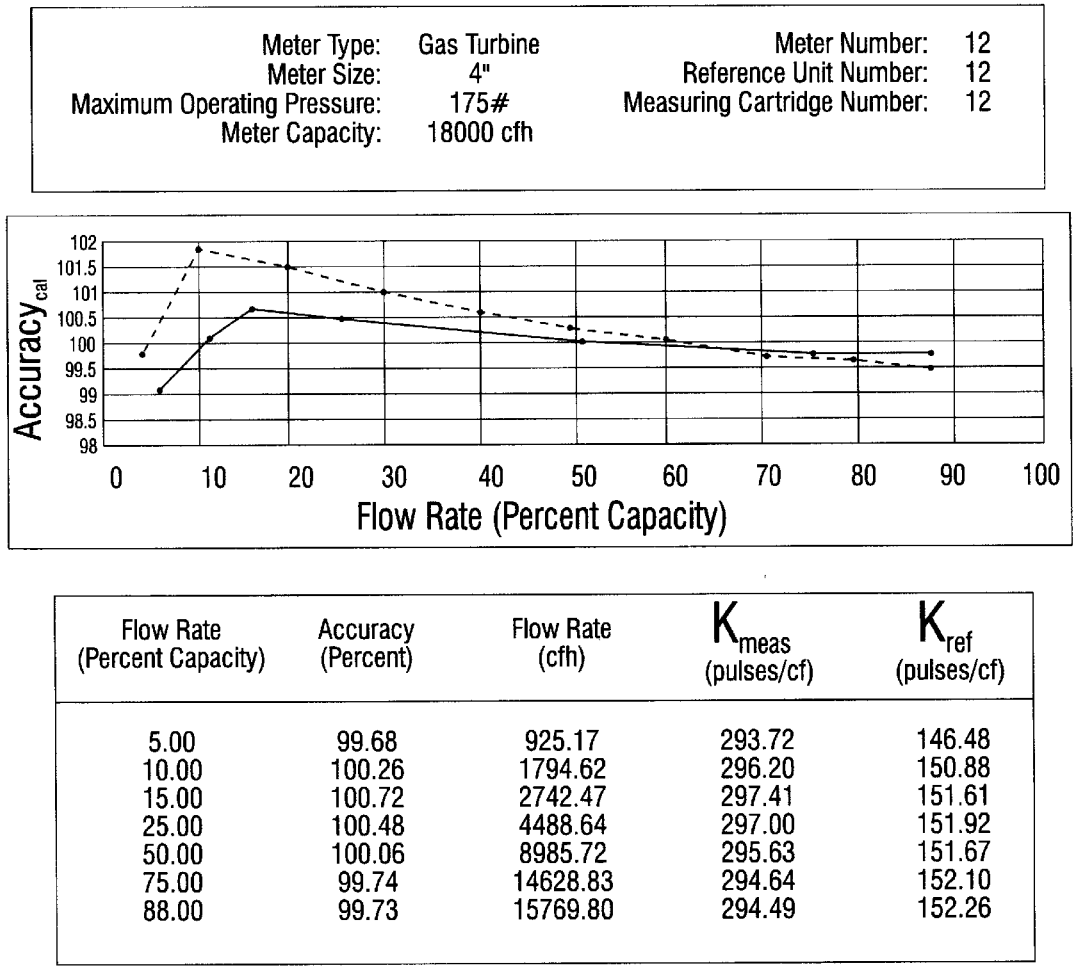
FIG. 26 is an accuracy chart for a gas turbine meter made in accordance with this invention.

The segmented line curve in the graph shown in FIG. 26 shows a typical accuracy curve prior to calibration of a gas turbine meter. The hump at low flow rates in the segmented line accuracy curve is pronounced and unacceptable for a commerical meter. A typical accuracy curve for a gas turbine meter calibrated in accordance with one aspect of this invention is shown in the solid line curve of the graph in FIG. 26. The meter was pressurized for the accuracy test at 0.25 psi. It can be seen with respect to the solid line curve on the graph in FIG. 26 that even with a calibrated meter, there is a hump in the accuracy curve at low flow rates, albeit within acceptable limits. In the accuracy curve shown the meter register records less gas than has actually flowed through it below a flow rate of about 10% of the maximum capacity of the meter, and it records more gas than has actually flowed through it until the meter reaches a flow rate of about 50% of its maximum capacity.

Figure 24:
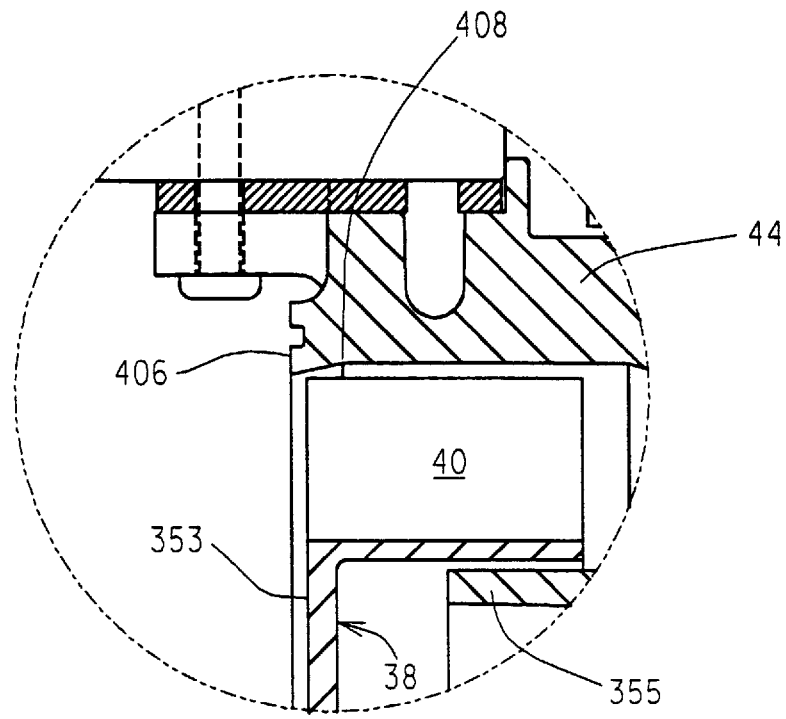
FIG. 24 is an enlarged view showing the location of the upstream tips of turbine blades with respect to a taper cross section of the measuring cartridge housing.
Figure 25:
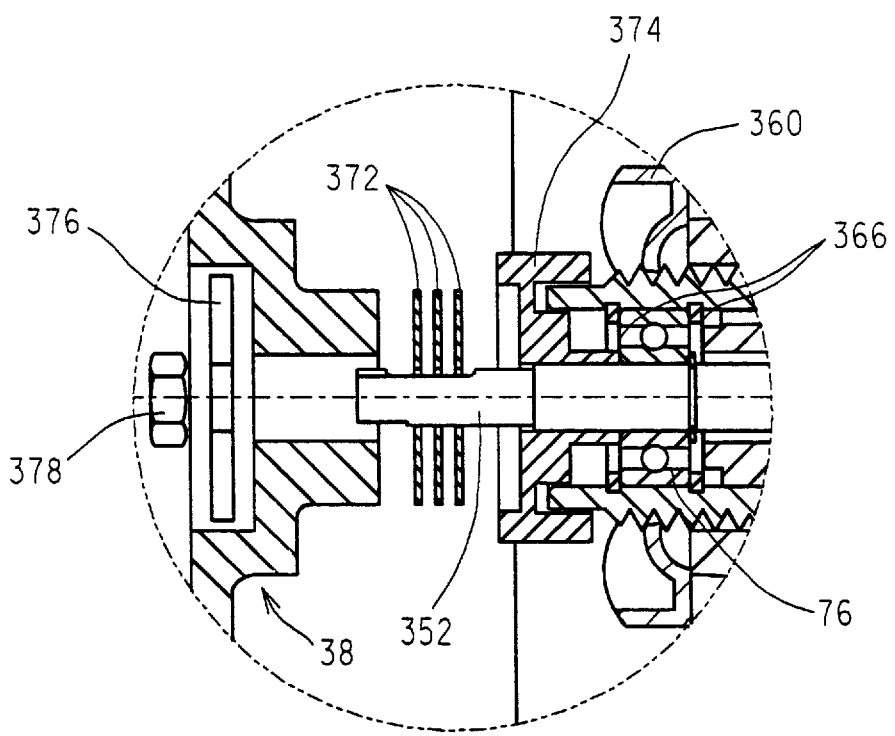
FIG. 25 is an enlarged view, partially exploded, of the structure of the rotor and rotor shaft assembly showing shims for locating the position of the upstream tips of turbine blades.

In accordance with still another aspect of this invention, the gas turbine meter 350 shown in FIG. 23 has structures, shown more specifically FIG. 24 and FIG. 25, which allow the adjustment of the accuracy of the meter to minimize the hump in the accuracy curve which occurs at low flow rates without adversely affecting the accuracy curve at high flow rates. Referring to FIG. 24, measuring cartridge 44 has a conical interior surface having an axial cross section which, extending from its upstream end 406 and over a predetermined length to a point on its interior surface, is tapered away from the turbine blades 40 at an angle which ranges from between about 5° and about 7°. In other words, the interior diameter of the measuring cartridge 44 increases at an angle within this range of angles over a predetermined length between the upstream end 406 of the measuring cartridge housing 44 and point 408 on the interior surface of the housing.

The clearance between the tips of turbine blades 40 and the interior surface of the measuring cartridge 44 can be modified by adjusting the position of the upstream tips of the turbine blades 40 to a desired secured position within the tapered area of the cartridge housing. An increase in tip clearance causes rotor speed to decrease. The reason for the decrease in rotor speed, from an energy transfer standpoint, is that more gas bypasses the turbine blades 40 through an increased clearance area. Thus, there is a lesser transfer of the kinetic energy from the gas to the rotor blades 40 and a resulting decrease in the speed of rotation of the rotor 38. Conversely, a decrease in tip clearance has the opposite effect, with more gas flowing through the rotor blades 40 to increase the speed of rotation of measuring rotor 38. In accordance with a further aspect of this invention, it has been found that optimum results are obtained by having a clearance between the upstream tips of the turbine blades and the tapered interior surface of the measuring cartridge which can be adjusted within a range from about 0.010 inches to about 0.045 inches.

The position of the upstream tips of the turbine blades 40 can be adjusted and finally, securely located through the use of any convenient mechanism or method. As shown in FIG. 25, in the preferred embodiment the position of the upstream ends of the tips of turbine blades 40 is controlled with respect to the tapered area through the use of one or more shims 372 placed on the rotor shaft 352 between the rotor 38 and the bearing shield 374. To adjust the position of the upstream tips of the turbine blades 40 with respect to the tapered area, the nut 378 is removed from the end of the rotor shaft 352 and the rotor 38 is removed from the rotor shaft 352. Additional shims or thicker shims can be used to move the tips of the turbine blades 40 to the left or upstream within the measuring cartridge housing 44. This decreases the clearance between the inside surface of the measuring cartridge 44 and the upstream ends of the turbine blades 40, increasing the speed of rotation of the measuring rotor 38 caused by the flow of a unit of gas. One or more of the shims 372 may be removed, or thinner shims may be used, to move the upstream ends of the turbine blades 40 to the right, or downstream, within the meter 350. This increases the clearance between the inside surface of the measuring cartridge 44 and the upstream ends of the turbine blades 40, thereby decreasing the speed of rotation of the rotor 38 caused by a flow of a unit of gas. This increase or decrease in speed of rotation is more pronounced at lower gas flowrates than it is at higher gas flowrates. Additionally, this increase or decrease in speed of rotation is more effective at lower operating pressures than at higher operating pressures. This allows the low pressure and the high pressure accuracy curves to be brought more closely together.

Referring once again to FIG. 26, if the low flow rate portion of the accuracy curve is unacceptably lower than the higher flow rate portion of that curve, decreasing the tip clearance raises the low flow rate portion of the curve toward the high flow rate portion. If the low flow rate portion of the accuracy curve for a gas turbine meter is unacceptably higher than the high flow rate portion of that curve, increasing the tip clearance reduces the low flow rate portion of that curve toward the high flow rate portion.

The range of wall angles which enables the accuracy of a gas turbine meter to be effectively adjusted was determined by extrapolating from general principles of fluid mechanics concerning pressure flow in smooth channels with various angles between walls and by testing the effects of gas velocity distributions with various internal wall angles between end 406 and point 408. It was found that when the angle of the wall 406 to 408 is below about 5° the measuring rotor 38 had to be moved too far axially to get the proper change in tip clearance to adequately adjust the accuracy of the gas turbine meter. When the angle of the wall 406 to 408 is above about 7°, the accuracy of the gas turbine meter at high flow rates begins to drop off in an unsatisfactory manner. The angle chosen for any particular meter within this approximate range of angles will depend upon the specific characteristics of that meter.

Those skilled in the art will recognize that the various features of this invetion described above can be used by themselves in a single rotor or a dual rotor gas turbine meter. Or two or more features of this invention can be combined in a single rotor or a dual rotor gas turbine meter. Additionally, this invention has been explained with respect to the details, arrangements of components and steps of certain specific embodiments which have been described and illustrated to explain the nature of this invention. Many modifications and changes can be made to this invention by those skilled in the art without departing from its spirit and scope. Thus, the appended claims are intended to be interpreted to cover such equivalent gas turbine meters, systems and methods which do not depart from the spirit and scope of this invention.

What is claimed as new and desired to be obtained by Letters Patent is as follows:

1. A gas turbine meter for measuring the volume of a stream of gas flowing therethrough comprising:
   (a) An elongated, cylindrical housing defining a flow path for the gas, said housing having an inlet port, a central axis and an outlet port;
   (b) An inlet flow straightener mounted in said flow path adjacent said inlet port to form a constant area passage which causes gas from said inlet port to flow substantially axially in said housing;
   (c) A measuring cartridge mounted downstream of said inlet flow straightener and adjacent thereto and including a measuring rotor for rotation about the axis of said housing; said measuring rotor having turbine blades mounted thereon at blade angles which cause it to rotate in one direction with respect to the axis of said housing at a speed approximately proportional to the velocity of the gas flowing through said housing;
   (d) A reference flow straightener mounted in said housing downstream of said measuring rotor to form a constant area passage having an area approximately equal to that of the passage formed by said inlet flow straightener to cause gas from said measuring rotor to flow substantially axially in said housing;
   (e) A reference rotor mounted downstream of said reference flow straightener and adjacent thereto for rotation about the axis of said housing; said reference rotor having turbine blades mounted thereon with blade angles which cause said reference rotor to rotate in a direction opposite the direction of rotation of said measuring rotor at a speed approximately proportional to the velocity of gas flowing through said housing;
   (f) A measuring signal generator responsive to said measuring rotor for generating a measuring signal proportional to the speed of rotation of said measuring rotor;

(g) A reference signal generator responsive to said reference rotor generating a reference signal proportional to the speed of rotation of said reference rotor; and (h) A signal processor responsive to said measuring signal generator and reference signal generator for providing an indication of the accuracy of said gas turbine meter based on the quotient of the measuring signal divided by the reference signal.

2. A gas turbine meter according to claim 1 in which said signal processor includes a representation of a K factor, $K_{meas}$, determined for said measuring rotor at the operating conditions of the said gas turbine meter, and a representation of a K factor, $K_{ref}$, determined for said reference rotor at the operating conditions of said gas turbine meter and the indication of accuracy is based also on the quotient of $K_{ref}$ divided by $K_{meas}$.

3. A gas turbine meter according to claim 2 in which a representation of the accuracy of said gas turbine meter at time of its calibration for the operating conditions of said gas turbine meter, $Accuracy_{cal}$ is included within said signal processor, and the indication of accuracy is determined by the quotient of the frequency of the measuring frequency divided by the frequency of the reference signal, which quotient is multiplied by the quotient of the $K_{ref}$ divided by $K_{meas}$, and multiplied by $Accuracy_{cal}$.

4. A gas turbine meter according to claim 1 in which said signal processor includes a representation of the desired accuracy of said gas turbine meter and provides a measure of the differences between the desired accuracy and the indicated accuracy of said gas turbine meter.

5. A gas turbine meter according to claim 2 in which said signal processor includes a representation of the desired accuracy of said gas turbine meter and provides a measure of the differences between the desired accuracy and the indicated accuracy of said gas turbine meter.

6. A gas turbine meter according to claim 3 in which said signal processor includes a representation of the desired accuracy of said gas turbine meter and provides a measure of the difference between the desired accuracy and the indicated accuracy of said gas turbine meter.

7. A gas turbine meter for measuring the volume of a stream of gas flowing therethrough comprising:

(a) An elongated, cylindrical housing defining a flow path for the gas, said housing having an inlet port, a central axis and an outlet port;

(b) An inlet flow straightener mounted in said flow path adjacent said inlet port to form a constant area passage which causes gas from said inlet port to flow substantially axially in said housing;

(c) A measuring cartridge mounted downstream of said inlet flow straightener and adjacent thereto and including a measuring rotor for rotation about the axis of said housing; said measuring rotor having turbine blades mounted thereon at blade angles which cause it to rotate in one direction with respect to the axis of said housing at a speed approximately proportional to the velocity of the gas flowing through said housing;

(d) A reference flow straightener mounted in said housing downstream of said measuring rotor to form a constant area passage having an area approximately equal to that of the passage formed by said inlet flow straightener to cause gas from said measuring rotor to flow substantially axially in said housing;

(e) A reference rotor mounted downstream of said reference flow straightener and adjacent thereto for rotation about the axis of said housing; said reference rotor having turbine blades mounted thereon with blade angles which cause said reference rotor to rotate in a direction opposite the direction of rotation of said measuring rotor at a speed approximately proportional to the velocity of gas flowing through said housing;

(f) A measuring signal generator responsive to said measuring rotor for generating a measuring signal having its frequency $f_{meas}$ proportional to the speed of rotation of said measuring rotor;

(g) A reference signal generator responsive to said reference rotor generating a reference signal having its frequency $f_{ref}$ proportional to the speed of rotation of said reference rotor; and (h) A signal processor responsive to said measuring signal generator and said reference signal generator for determining the accuracy of said gas turbine meter according to the formula:

$$\left( \frac{K_{ref}}{K_{meas}} \text{Accuracy}_{cal} \right) \frac{f_{meas}}{f_{ref}},$$

where at the operating conditions of the measuring rotor and reference rotor, $K_{meas}$ is the K factor of the measuring rotor, $K_{ref}$ is the K factor of the reference rotor, and $Accuracy_{cal}$ is the accuracy of the mechanical output of the measuring rotor determined during calibration of the meter.

8. A gas turbine meter according to claim 7 in which said signal processor compares the $Accuracy_{cal}$ to the current accuracy of the meter according to the formula:

$$\text{Accuracy}_{cal} \left[ 1 - \frac{K_{ref}}{K_{meas}} \cdot \frac{f_{meas}}{f_{ref}} \right].$$

9. A gas turbine meter according to claim 8 in which the signal processor compares the difference between $Accuracy_{cal}$ and the current accuracy of the meter to the value of an error limit according to the formula:

$$\left| \text{Accuracy}_{cal} \left[ 1 - \frac{K_{ref}}{K_{meas}} \cdot \frac{f_{meas}}{f_{ref}} \right] \right| > \text{error limit}.$$

10. A gas turbine meter according to claim 7 in which said measuring signal generator responds to said turbine blades of said measuring rotor to generate the measuring signal, and said reference signal generator responds to said turbine blades on said reference rotor to generate the reference signal, and said signal processor produces a signal pattern representing signals generated by the rotation of said rotor blades.

11. A gas turbine meter according to claim 1 in which said measuring signal generator responds to said turbine blades of said measuring rotor to generate the measuring signal, and said reference signal generator responds to said turbine blades on said reference rotor to generate the reference signal, and said signal processor produces a signal pattern representing signals generated by the rotation of said rotor blades.

12. A gas turbine meter according to claim 7 in which said reference signal generator responds to the rotation of said turbine blades on said reference rotor to generate the reference signal, and said measuring signal generator responds to the rotation of said turbine blades on said measuring rotor to generate the measuring signal, and said signal processor includes an amplifier to amplify the reference signals and the measuring signals and further includes an isolator connected between both said measuring signal generator and said reference signal generator and said amplifier to isolate said measuring signal generator and said reference signal generator from said amplifier.

13. A gas turbine meter according to claim 1 in which said reference signal generator responds to the rotation of said turbine blades on said reference rotor to generate the reference signal, and said measuring signal generator responds to the rotation of said turbine blades on said measuring rotor to generate the measuring signal, and said signal processor includes an amplifier to amplify the reference signals and the measuring signals and further includes an isolator connected between both said measuring signal generator and said reference signal generator and said amplifier to isolate said measuring signal generator and said reference signal generator from said amplifier.

14. A gas turbine meter according to claim 7 in which said signal processor determines the value of the frequencies $f_{meas}$ and $f_{ref}$ used in determining the accuracy of said gas turbine meter by taking the average of a plurality of samples of measurements of these frequencies.

15. A gas turbine meter according to claim 7 in which said signal processor is a virtual instrument having a front panel which can display the flow rate of gas through said gas turbine meter, and the determined accuracy of said gas turbine meter.

16. A gas turbine meter according to claim 9 in which said signal processor is a virtual instrument having a front panel which can display the flow rate of gas through said gas turbine meter, the determined accuracy of said gas turbine meter, the results of the comparison of the Accuracy$_{cal}$ to the current accuracy of said gas turbine meter, and the result of the comparison of the difference between Accuracy$_{cal}$ and the current accuracy of said gas turbine meter to the value of an error limit for the difference.

17. A gas turbine meter for measuring the volume of a stream of gas flowing therethrough comprising:

(a) An elongated, cylindrical housing defining a flow path for the gas, said housing having an inlet port, a central axis and an outlet port;

(b) An inlet flow straightener mounted in said flow path adjacent said inlet port to form a constant area passage which causes gas from said inlet port to flow substantially axially in said housing;

(c) A measuring cartridge mounted downstream of said inlet flow straightener and adjacent thereto and including a measuring rotor for rotation about the axis of said housing; said measuring rotor having turbine blades mounted thereon at blade angles which cause it to rotate in one direction with respect to the axis of said housing at a speed approximately proportional to the velocity of the gas flowing through said housing;

(d) A reference flow straightener mounted in said housing downstream of said measuring rotor to form a constant area passage having an area approximately equal to that of the passage formed by said inlet flow straightener to cause gas from said measuring rotor to flow substantially axially in said housing;

(e) A reference rotor mounted downstream of said reference flow straightener and adjacent thereto for rotation about the axis of said housing; said reference rotor having turbine blades mounted thereon at approximately 18.5° blade angles which cause said reference rotor to rotate in a direction opposite the direction of rotation of said measuring rotor at a speed less than the speed of said measuring rotor approximately proportional to the velocity of gas flowing through said housing;

(f) A measuring signal generator responsive to said measuring rotor for generating a measuring signal proportional to the speed of rotation of said measuring rotor;

(g) A reference signal generator responsive to said reference rotor generating a reference signal proportional to the speed of rotation of said reference rotor; and (h) A signal processor responsive to said measuring signal generator and reference signal generator for providing an indication of the accuracy of said gas turbine meter based on the quotient of the measuring signal divided by the reference signal.

18. A gas turbine meter according to claim 17 in which the blade angles of said turbine blades of said measuring rotor are set at approximately 45°.

19. A gas turbine meter according to claim 17 in which the blade angles of said turbine blades of said measuring rotor are set at approximately 30°.

20. A gas turbine meter for measuring the volume of a stream of gas flowing therethrough comprising:

(a) An elongated, cylindrical housing defining a flow path for the gas, said housing having an inlet port, a central axis and an outlet port;

(b) An inlet flow straightener mounted in said flow path adjacent said inlet port to form a constant area passage which causes gas from said inlet port to flow substantially axially in said housing;

(c) A measuring cartridge mounted downstream of said inlet flow straightener and adjacent thereto and including a measuring rotor for rotation about the axis of said housing; said measuring rotor having turbine blades mounted thereon at blade angles which cause it to rotate in one direction with respect to the axis of said housing at a speed approximately proportional to the velocity of the gas flowing through said housing;

(d) A reference flow straightener mounted in said housing downstream of said measuring rotor to form a constant area passage having an area approximately equal to that of the passage formed by said inlet flow straightener to cause gas from said measuring rotor to flow substantially axially in said housing; said reference rotor flow straightener including a central housing, a plurality of fins extending radially and outwardly from said central housing and a cylindrical flow guide mounted on the radial ends of said fins and extending over said reference rotor;

(e) A reference rotor mounted downstream of said reference flow straightener and adjacent thereto for rotation about the axis of said housing; said reference rotor having turbine blades mounted thereon with blade angles which cause said reference rotor to rotate in a direction opposite the direction of rotation of said measuring rotor at a speed approximately proportional to the velocity of gas flowing through said housing;

(f) A measuring signal generator responsive to said measuring rotor for generating a measuring signal proportional to the speed of rotation of said measuring rotor;

(g) A reference signal generator responsive to said reference rotor generating a reference signal proportional to the speed of rotation of said reference rotor; and (h) A signal processor responsive to said measuring signal generator and reference signal generator for providing an indication of the accuracy of said gas turbine meter based on the quotient of the measuring signal divided by the reference signal.

21. A gas turbine meter according to claim 20 which includes reference rotor bearings mounted within said central housing and a shaft connecting said reference rotor to said reference rotor bearings; said reference flow straightener, said reference rotor bearings and said reference rotor comprising an integral assembly which is removable from said housing.

22. A gas turbine meter according to claim 21 in which said integral assembly, including said extension of said cylindrical flow guide, is constructed so as to enable said reference rotor to retain its calibration after said integral assembly is removed from said housing.

23. A gas turbine meter according to claim 21 which includes measuring rotor bearings mounted within said measuring cartridge and a shaft connecting said measuring rotor to said measuring rotor bearings; said reference rotor bearings being self-lubricating and having a longer normal useful life than said measuring rotor bearings.

24. A gas turbine meter according to claim 23 in which said reference rotor bearings are mounted within said central housing by a substantially solid structure which surrounds said bearings.

25. A gas turbine meter according to claim 23 in which said reference rotor bearings are constructed of a silicon nitride material.

26. A gas turbine meter according to claim 20 in which the blade angles of said turbine blades of said reference rotor cause said reference rotor to rotate at a speed slower than the speed of rotation of said measuring rotor.

27. A gas turbine meter according to claim 23 in which the blade angles of said turbine blades of said reference rotor cause said reference rotor to rotate at a speed slower than the speed of rotation of said measuring rotor and said self-lubricated bearings are made of a silicon nitride material.

28. A gas turbine meter for measuring the volume of a stream of gas flowing therethrough comprising:
   (a) An elongated, cylindrical housing defining a flow path for the gas, said housing having an inlet port, a central axis and an outlet port;
   (b) An inlet flow straightener mounted in said flow path adjacent said inlet port to form a constant area passage which causes gas from said inlet port to flow substantially axially in said housing;
   (c) A measuring cartridge mounted downstream of said inlet flow straightener and adjacent thereto and including a measuring rotor at its upstream end which rotates about the axis of said housing; said measuring rotor having turbine blades with their upstream tips extending toward said inlet port and mounted thereon at blade angles which cause said rotor to rotate in one direction with respect to the axis of said housing at a speed approximately proportional to the velocity of the gas flowing through said housing;
   (d) Said measuring cartridge having an interior surface forming the flow path for gas to be measured, said interior surface having a conical axial cross section around said turbine blades which over a predetermined length from its upstream end is tapered away from said turbine blades at an angle between about 5° and about 7°;
   (e) A mechanism included as a portion of said measuring cartridge which locates said upstream tips of said turbine blades at a preselected position with respect to said tapered interior surface of said cartridge;
   (f) A reference flow straightener mounted in said housing downstream of said measuring rotor to form a constant area passage having an area approximately equal to that of the passage formed by said inlet flow straightener to cause gas from said measuring rotor to flow substantially axially in said housing;
   (g) A reference rotor mounted downstream of said reference flow straightener and adjacent thereto for rotation about the axis of said housing; said reference rotor having turbine blades mounted thereon with blade angles which cause said reference rotor to rotate in a direction opposite the direction of rotation of said measuring rotor at a speed approximately proportional to the velocity of gas flowing through said housing;
   (h) A measuring signal generator responsive to said measuring rotor for generating a measuring signal proportional to the speed of rotation of said measuring rotor;
   (i) A reference signal generator responsive to said reference rotor generating a reference signal proportional to the speed of rotation of said reference rotor;
   and
   (j) A signal processor responsive to said measuring signal generator and reference signal generator for providing an indication of the accuracy of said gas turbine meter based on the quotient of the measuring signal divided by the reference signal.

29. A gas turbine meter according to claim 28 in which the clearance between the upstream tips of said rotor blades and said tapered interior surface of said cartridge can be adjusted by locating the position of said upstream tips within a range of from approximately 0.010 inches to approximately 0.045 inches of said tapered interior surface of said cartridge.

30. A gas turbine meter according to claim 28 in which said mechanism which locates the position of said upstream tips of said rotor blades includes at least one spacer used to mount said measuring rotor.

31. A gas turbine meter for measuring the volume of a stream of gas flowing therethrough comprising:
   (a) An elongated, cylindrical housing defining a flow path for the gas, said housing having an inlet port, a central axis and an outlet port;
   (b) An inlet flow straightener mounted in said flow path adjacent said inlet port to form a constant area passage which causes gas from said inlet port to flow substantially axially in said housing;
   (c) A measuring cartridge mounted downstream of said inlet flow straightener and adjacent thereto and including a measuring rotor for rotation about the axis of said housing; said measuring rotor having turbine blades mounted thereon at blade angles which cause it to rotate in one direction with respect to the axis of said housing at a speed approximately proportional to the velocity of the gas flowing through said housing;
   (d) Said measuring rotor mounted at the upstream end of said measuring cartridge and including a cylindrical rotor hub on which said turbine blades are mounted;
   (e) Said measuring cartridge including a cylindrical chamber concentric with said rotor which has an upstream end through which said measuring rotor is mounted and has a downstream end, the outside diameter of said cylindrical chamber being slightly less than the inside diameter of said rotor hub, with the axial length of said cylindrical chamber being such that its upstream end extends beneath said rotor hub when said measuring chamber is mounted within said measuring cartridge, and that portion of the outside surface of said measuring chamber in the vicinity of said rotor being continuous and smooth so that contamination cannot accumulate near the clearance between said rotor hub and said cylindrical chamber;

(f) Rotor bearings for said measuring rotor and a shaft for connecting said measuring rotor to said bearings;

(g) Said cylindrical chamber including a structure within it for mounting said rotor bearings downstream of said location where said shaft is connected to said measuring rotor, with the downstream end of said structure being closed to the flow of gas through said gas turbine meter when said bearings are mounted within said structure;

(h) A reference flow straightener mounted in said housing downstream of said measuring rotor to form a constant area passage having an area approximately equal to that of the passage formed by said inlet flow straightener to cause gas from said measuring rotor to flow substantially axially in said housing;

(i) A reference rotor mounted downstream of said reference flow straightener and adjacent thereto for rotation about the axis of said housing; said reference rotor having turbine blades mounted thereon with blade angles which cause said reference rotor to rotate in a direction opposite the direction of rotation of said measuring rotor at a speed approximately proportional to the velocity of gas flowing through said housing;

(j) A measuring signal generator responsive to said measuring rotor for generating a measuring signal proportional to the speed of rotation of said measuring rotor;

(k) A reference signal generator responsive to said reference rotor generating a reference signal proportional to the speed of rotation of said reference rotor; and (l) A signal processor responsive to said measuring signal generator and reference signal generator for providing an indication of the accuracy of said gas turbine meter based on the quotient of the measuring signal divided by the reference signal.

32. A gas turbine meter according to claim 31 which includes a register for measuring the flow of gas through said gas turbine meter; said measuring cartridge including a coupling chamber located downstream of said bearing holder; a coupling located within said coupling chamber and connected between rotor shaft and said register; and a cover plate attached to the downstream end of said measuring chamber to prevent gas from flowing into said coupling chamber.

33. A gas turbine meter according to claim 32 which includes an orifice in said cover plate and a filter cartridge mounted in said orifice to allow heat and pressure to dissipate while preventing contaminants from entering said coupling chamber.

34. A gas turbine meter according to claim 28 in which:

(a) Said measuring rotor is mounted within said measuring cartridge and at the upstream end of said measuring cartridge and includes a cylindrical rotor hub on which said turbine blades are mounted;

(b) Said measuring cartridge including a cylindrical chamber concentric with said rotor which has an upstream end through which said measuring rotor is mounted and has a downstream end, the outside diameter of said cylindrical chamber being slightly less than the inside diameter of said rotor hub, with the axial length of said cylindrical chamber being such that its upstream end extends beneath said rotor hub when said measuring chamber is mounted within said measuring cartridge, and that portion of the outside surface of said measuring chamber in the vicinity of said rotor being continuous and smooth so that contamination cannot accumulate near the clearance between said rotor hub and said cylindrical chamber; and (c) Rotor bearings for said measuring rotor and the shaft for connecting said measuring rotor to said bearings; and (d) Said cylindrical chamber including a structure within it for mounting said rotor bearings downstream of said location where said shaft is connected to said measuring rotor, with the downstream end of said structure being closed to the normal flow of gas through said gas turbine meter when said bearings are mounted within said structure.

35. A gas turbine meter for measuring the volume of flow of a stream of gas comprising:

(a) An elongated cylindrical housing defining a flow path for the gas, said elongated housing having an inlet port, a central axis and outlet port;

(b) A flow straightening assembly mounted in said housing adjacent said inlet port to form a passage having a constant area to cause gas from said inlet port to flow substantially axially in said housing;

(c) A measuring cartridge mounted adjacent said flow straightening assembly in said housing;

(d) A measuring rotor mounted within said measuring cartridge and at the upstream end of said measuring cartridge;

(e) Said measuring rotor having turbine blades mounted thereon with blade angles which cause said measuring rotor to rotate at a speed approximately proportional to the velocity of gas flowing through said housing, said turbine blades having upstream tips extending toward said inlet port;

(f) Said measuring cartridge having an interior surface forming the flow path for gas to be measured, said interior surface having a conical axial cross section around said turbine blades which over a predetermined length from its upstream end is tapered in the range of between about five degrees and about seven degrees away from said turbine blades; and (g) A mechanism included as a portion of said measuring cartridge which locates said upstream tips of said turbine blades at a preselected position with respect to said tapered interior surface of said cartridge.

36. A gas turbine meter according to claim 35 in which said mechanism which locates the position of said upstream tips of said rotor blades includes at least one spacer used to mount said measuring rotor.

37. A gas turbine meter according to claim 35 in which the clearance between the upstream tips of said rotor blades and said tapered interior surface of said cartridge can be adjusted by locating the position of said upstream tips of said rotor blades within a range of approximately 0.010 inches to approximately 0.045 inches of said tapered interior surface of said cartridge.

38. A gas turbine meter for measuring the volume of flow of a stream of gas comprising:

(a) An elongated cylindrical housing defining a flow path for the gas, said elongated housing having an inlet port and outlet port;

(b) A flow straightening assembly mounted in said housing adjacent said inlet port to form a passage having a constant area to cause gas from said inlet port to flow substantially axially in said housing;

(c) A measuring cartridge mounted adjacent said first flow straightener assembly in said housing;

(d) A measuring rotor mounted within said measuring cartridge and at the upstream end of said measuring cartridge;

(e) Said measuring rotor having turbine blades mounted thereon with blade angles which cause said measuring rotor to rotate at a speed proportional to the velocity of gas flowing through said housing, said turbine blades having upstream tips extending toward said inlet port;

(f) Said measuring cartridge having an interior surface which defines the flow path of the gas to be measured, said interior surface having a conical shape, adjacent the location where said upstream tips of said turbine blades are located, which gradually increases in diameter in a range of between about five degrees and about seven degrees over a predetermined length from the upstream end of said measuring cartridge to such an extent that the accuracy of said meter can be changed by changing the clearance between said turbine blades and said interior surface of said housing; and (g) A mechanism included as a portion of said measuring cartridge which locates a secured position of said upstream tips of said turbine blades of said metering rotor axially within the preselected distance of said interior surface.

39. A gas turbine meter according to claim 38 in which the clearance between the upstream tips of said turbine blade and said tapered interior surface of said cartridge can be adjusted by locating the position of said upstream tips within a range of from approximately 0.010 inches to approximately 0.045 inches of said tapered interior surface of said cartridge.

40. A gas turbine meter for measuring the volume of flow of a stream of gas through a pipe comprising:

(a) An elongated housing defining a flow path for the gas, said elongated housing having an inlet port and outlet port;

(b) A flow straightener mounted in said housing adjacent said inlet port;

(c) A measuring cartridge mounted downstream of said first flow straightener and adjacent it in said housing;

(d) A measuring rotor mounted within said measuring cartridge and at the upstream end of said measuring cartridge and includes a cylindrical rotor hub and a plurality or turbine blades mounted on said rotor rub;

(e) Said measuring cartridge including a cylindrical chamber concentric with said rotor which has an upstream end through which said measuring rotor is mounted and has a downstream end, the outside diameter of said cylindrical chamber being slightly less than the inside diameter of said rotor bush, with the axial length of said cylindrical chamber being such that its upstream end extends beneath said rotor hub when said measuring rotor is mounted within said measuring cartridge, and that portion of the outside surface of said cylindrical chamber in the vicinity of said rotor being continuous and smooth so that contamination cannot accumulate near the clearance between said rotor hub and said cylindrical chamber;

(f) Rotor bearings for said measuring rotor and a shaft for connecting said measuring rotor to said bearings; and (g) Said cylindrical chamber including a structure within it for mounting said rotor bearings downstream of the location where said shaft is connected to said measuring rotor, with the downstream end of said structure being closed to the normal flow of gas through said gas turbine meter when said bearings are mounted within said structure.

41. A gas turbine meter according to claim 40 which includes a register for measuring the flow of gas through said gas turbine meter; said measuring cartridge including a coupling chamber located downstream of said bearing holder; a coupling located within said coupling chamber and connected between said rotor shaft and said register; and a cover plate attached to the downstream end of said measuring chamber to prevent gas from flowing into said coupling chamber.

42. A gas turbine meter according to claim 41 which includes an orifice in said end plate and a filter cartridge mounted in said orifice to allow heat and pressure to dissipate while preventing contaminants from entering said coupling chamber.

43. A method of using a computer processor to analyze the accuracy of a gas turbine meter having a measuring rotor and a reference rotor rotating substantially independently of the effects of the measuring rotor comprising the steps of:

(a) Selecting measuring signals from the measuring rotor approximately proportional to the speed of rotation of the measuring rotor;

(b) Selecting reference signals from the reference rotor approximately proportional to the speed of rotation of the reference rotor;

(c) Using a signal processor to determine the flowrate through the gas turbine meter and adjusting the flowrate to a level desired for determining the accuracy of the meter; and (d) Using a signal processor to process the measuring signals and the reference signals to determine the accuracy of the gas turbine meter based on the quotient of the measuring signals divided by the reference signals.

44. A method of using a computer processor to analyze the accuracy of a gas turbine meter having a measuring rotor and a reference rotor rotating substantially independently of the effects of the measuring rotor comprising the steps of:

(a) Selecting measuring signals from the measuring rotor having a frequency $f_{meas}$ approximately proportional to the speed of rotation of the measuring rotor;

(b) Selecting reference signals from the reference rotor having a frequency $f_{ref}$ approximately proportional to the speed of rotation of the reference rotor; and (c) Using a signal processor to process the measuring signal and the reference signal to determine the accuracy of the gas turbine meter according to the formula:

$$\left( \frac{K_{ref}}{K_{meas}} \text{Accuracy}_{cal} \right) \frac{f_{meas}}{f_{ref}},$$

where at the operating conditions of the measuring rotor and reference rotor, $K_{meas}$ is the K factor of the measuring rotor, $K_{ref}$ is the K factor of the reference rotor, and $\text{Accuracy}_{cal}$ is the accuracy of the measuring rotor determined during calibration of the meter.

45. A method according to claim 44 which includes a step of comparing the $\text{Accuracy}_{cal}$ to the current accuracy of the meter according to the formula:

$$\text{Accuracy}_{cal}\left[1-\frac{K_{ref}}{K_{meas}}\cdot\frac{f_{meas}}{f_{ref}}\right].$$

46. A method according to claim 45 which includes the steps of:
   (1) comparing the difference between Accuracy$_{cal}$ and the current accuracy of the meter to the value of an error limit according to the formula:

$$\left|\text{Accuracy}_{cal}\left[1-\frac{K_{ref}}{K_{meas}}\cdot\frac{f_{meas}}{f_{ref}}\right]\right| > \text{error limit,}$$

(2) displaying an indication of the result of this comparison.

47. A method according to claim 44 including the steps of determining the flowrate of gas to the meter according to the formula:

$$\frac{f_{meas}}{K_{meas}},$$

displaying the flowrate, and adjusting the flowrate to a level desired for testing the accuracy of the meter.

48. A method according to claim 44 including the steps of:
generating measuring signals through the use of a detector which senses rotor blades rotating on the measuring rotor, generating reference signals through the use of a detector which senses rotor blades rotating on the reference rotor, and producing a signal pattern representing signals generated by rotating rotor blades.

49. A method of using a computer processor to analyze the accuracy of any one of a plurality of gas turbine meters each having a measuring rotor and a reference rotor rotating substantially independently of the effects of the measuring rotor comprising the steps of:
   (a) Choosing the gas turbine meter whose accuracy is to be analyzed;
   (b) Selecting from the chosen gas turbine meter the measuring signals from the measuring rotor approximately proportional to the speed of rotation of the measuring rotor;
   (c) Selecting from the chosen gas turbine meter the reference signals from the reference rotor approximately proportional to the speed of rotation of the reference rotor;
   (d) Using a signal processor to determine the flowrate through the chosen gas turbine meter and adjusting the flowrate to a level desired for determining the accuracy of the meter; and
   (e) Using a signal processor to process the measuring signals and the reference signals to determine the accuracy of the chosen gas turbine meter based on the quotient of the measuring signals divided by the reference signals.

50. The method according to claim 49 which includes the step of storing signals representing the accuracy of the chosen gas turbine meter.

51. A method of using a computer processor to analyze the accuracy of any one of a plurality of gas turbine meters each having a measuring rotor and a reference rotor rotating substantially independently of the effects of the measuring rotor comprising the steps of:
   (a) Choosing the gas turbine meter whose accuracy is to be analyzed;
   (b) Selecting from the chosen gas turbine meter measuring signals from the measuring rotor having a frequency $f_{meas}$ approximately proportional to the speed of rotation of the measuring rotor;
   (c) Selecting from the chosen gas turbine meter reference signals from the reference rotor having a frequency $f_{ref}$ approximately proportional to the chosen speed of rotation of the reference rotor; and
   (c) Using a signal processor to process the measuring signal and the reference signal to determine the accuracy of the chosen gas turbine meter according to the formula:

$$\left(\frac{K_{ref}}{K_{meas}}\text{Accuracy}_{cal}\right)\frac{f_{meas}}{f_{ref}},$$

where at the operating conditions of the measuring rotor and reference rotor,
   $K_{meas}$ is the K factor of the measuring rotor,
   $K_{ref}$ is the K factor of the reference rotor, and
   Accuracy$_{cal}$ is the accuracy of the measuring rotor determined during calibration of the meter.

52. A gas turbine meter for measuring the volume of a stream of gas flowing therethrough which is adapted to be used with a signal processor responsive to a measuring signal generator and a reference signal generator which are components of the gas turbine meter for providing an indication of the accuracy of the gas turbine meter based on the quotient of the measuring signal divided by the reference signal, the gas turbine meter comprising:
   (a) An elongated, cylindrical housing defining a flow path for the gas, said housing having an inlet port, a central axis and an outlet port;
   (b) An inlet flow straightener mounted in said flow path adjacent said inlet port to form a constant area passage which causes gas from said inlet port to flow substantially axially in said housing;
   (c) A measuring cartridge mounted downstream of said inlet flow straightener and adjacent thereto and including a measuring rotor for rotation about the axis of said housing; said measuring rotor having turbine blades mounted thereon at blade angles which cause it to rotate in one direction with respect to the axis of said housing at a speed approximately proportional to the velocity of the gas flowing through said housing;
   (d) A reference flow straightener mounted in said housing downstream of said measuring rotor to form a constant area passage having an area approximately equal to that of the passage formed by said inlet flow straightener to cause gas from said measuring rotor to flow substantially axially in said housing;
   (e) A reference rotor mounted downstream of said reference flow straightener and adjacent thereto for rotation about the axis of said housing; said reference rotor having turbine blades mounted thereon with blade angles which cause said reference rotor to rotate in a direction opposite the direction of rotation of said measuring rotor at a speed less than the speed of said measuring rotor which is approximately proportional to the velocity of gas flowing through said housing;
   (f) A measuring signal generator adapted to be coupled to the signal processor and responsive to said measuring rotor for generating a measuring signal proportional to the speed of rotation of said measuring rotor; and
   (g) A reference signal generator adapted to be coupled to the signal processor and responsive to said reference rotor generating a reference signal proportional to the speed of rotation of said reference rotor.

* * * * *